(12) United States Patent
Troya et al.

(10) Patent No.: US 7,606,333 B2
(45) Date of Patent: Oct. 20, 2009

(54) METHOD AND DEVICE FOR FRAME DETECTION AND SYNCHRONIZER

(75) Inventors: Alfonso Troya, Berlin (DE); Koushik Maharatna, Berlin (DE); Milos Krstic, Frankfurt (DE); Eckhard Grass, Berlin (DE)

(73) Assignee: IHP GmbH, Frankfurt (Oder) (DE)

( * ) Notice: Subject to any disclaimer, the term of this patent is extended or adjusted under 35 U.S.C. 154(b) by 569 days.

(21) Appl. No.: 10/521,396

(22) PCT Filed: Jul. 16, 2003

(86) PCT No.: PCT/EP03/07750
§ 371 (c)(1),
(2), (4) Date: Oct. 21, 2005

(87) PCT Pub. No.: WO2004/008706
PCT Pub. Date: Jan. 22, 2004

(65) Prior Publication Data
US 2006/0146962 A1    Jul. 6, 2006

(30) Foreign Application Priority Data
Jul. 16, 2002    (EP) ................................. 02090257

(51) Int. Cl.
*H04L 27/06* (2006.01)
(52) U.S. Cl. ....................................... 375/340; 375/354
(58) Field of Classification Search .................. 375/142, 375/260, 340, 343
See application file for complete search history.

(56) References Cited

U.S. PATENT DOCUMENTS
5,991,289 A * 11/1999 Huang et al. ................. 370/350
(Continued)

FOREIGN PATENT DOCUMENTS
EP         1 049 302        11/2000
(Continued)

OTHER PUBLICATIONS
"Orthogonal frequency division multiplex synchronization techniques for frequency-selective fading channels;" T. Keller et al; IEEE Journal on Selected Areas in Communications; vol. 19, No. 6, pp. 999-1008, Jun. 2001.
(Continued)

*Primary Examiner*—Mohammad H Ghayour
*Assistant Examiner*—Leon Flores
(74) *Attorney, Agent, or Firm*—Alfred A. Fressola; Ware, Fressola, Van Der Sluys & Adolphson LLP

(57) ABSTRACT

The IEEE 802.11a standard uses OFDM, where the transmission is divided into several orthogonal sub-carriers. Here, an algorithm is used for the frame detection; a simplified differentiator obtains an absolute maximum in the differentiated signal at that point where the first plateau in $J_F(k)$ starts; a peak detector obtains the position of the absolute maximum in the differentiated signal, divides the problem into relative peak detection and falling edge detection; a simplified XNOR-based crosscorrelator is used, where the simplifications are based on the knowledge of the reference; a particular solution is provided for the CORDIC algorithm in the vectoring mode for arctangent calculation; hardware structuring is presented for the whole synchronizer so as to obtain a simple control mechanism and the separation of this structure into different clock domains, each one being activated only to perform its operation and deactivated afterwards.

27 Claims, 16 Drawing Sheets

U.S. PATENT DOCUMENTS 6,320,917 B1    11/2001    Stott et al.
6,865,232 B1 *    3/2005    Isaksson et al. ............. 375/260

FOREIGN PATENT DOCUMENTS

| EP | 1071251 | 1/2001 |
|----|---------|--------|
| WO | WO 98/10545 | 3/1998 |
| WO | WO 00/77961 | 12/2000 |

OTHER PUBLICATIONS

"A fast burst synchronization scheme for OFDM;" M. Mizoguchi et al; Universal Personal Communications, 1998; vol. 1, pp. 125-129, Oct. 5, 1998.

"OFDM with trailing zeros versus OFDM with cyclic prefix: Links, comparison and application to the Hiperlan/2 system;" B. Muquet et al; 2000 IEEE International conference on communications; vol. 2 of 3, pp. 1049-1053, Jun. 18, 2000.

"Performance of an OFDM transceiver for radio transmission in industrial multipath environments;" A. Koukourgiannis et al; VTC 2001 Spring, IEEE Vehicular technology conference; vol. 2 of 4, pp. 805-809, May 6, 2001.

"A new OFDM standard for high rate wireless LAN in the 5 GHz band;" R. Van Nee; IEEE vehicular technology conference; vol. 1, pp. 258-262; Sep. 19, 1999.

"Structure and performance of the HIPERLAN/2 physical layer;" Khun-Jush Jamshid et al; IEEE vehicular technology conference; vol. 5, pp. 2667-2671; Sep. 19, 1999.

"Design considerations for minimal-power wireless spread spectrum circuits and systems;" B.A. Myers et al; Proceedings of the IEEE; vol. 88, No. 10, pp. 1598-1612; Oct. 10, 2000.

"Gated clock routing 30 for low-power microprocessor design;" Oh Aewon et al; IEEE transactions on computer-aided design of integrated circuits and systems; vol. 20, No. 6, pp. 715-722; Jun. 2001.

IEEE P802.11a/D7.0, Supplement to IEEE Standard 802.11, "Draft Supplement to Standard for Information Technology—Telecommunications and information exchange between systems—Local and metropolitan area networks—Specific Requirements—Part 11: Wireless LAN Medium Access Control (MAC) and Physical Layer (PHY) Specifications: High Speed Physical Layer in the 5 GHz Band," 1999.

Y. Chiu et al., "OFDM Receiver Design," XP-002263353, Final Report Dec. 12, 2000.

E. Grass et al., "On the single-chip implementation of a Hiperlan/2 and IEEE 802.11a capable modem," XP-001076795, *IEEE Personal Communications*, Dec. 2001, pp. 48-57.

M. Krstic et al., "Optimized low-power synchronizer design for the IEEE 802.11a standard," *ICASSP* 2003, pp. 333-336.

A. Troya et al., "OFDM synchronizer implementation for an IEEE 802.11a compliant modem," XP-009022041, *Proceedings of the IASTED International Conference*, Jul. 17-19, 2002, pp. 152-157.

L. Schwoerer et al., "VLSI implementation of IEEE 802.11a physical layer," *6th International OFDM Workshop*, Hamburg, 2001, pp. 28-1-28-4.

* cited by examiner

US 7,606,333 B2

METHOD AND DEVICE FOR FRAME DETECTION AND SYNCHRONIZER

CROSS REFERENCE TO RELATED APPLICATIONS

This application is for entry into the U.S. national phase under §371 for International Application No. PCT/EP03/07750 having an international filing date of Jul. 16, 2003, and from which priority is claimed under all applicable sections of Title 35 of the United States Code including, but not limited to, Sections 120, 363 and 365(c), and which in turn claims priority under 35 USC §119 to European Patent Application 02090257.3 filed on Jul. 16, 2002.

The present invention concerns a method for the detection of the reception of a data frame in an input signal, said data frame comprising periodically repeated symbols at the beginning. It further concerns a frame detector, a synchronizing method, and a synchronizer device.

BACKGROUND OF THE INVENTION

The IEEE 802.11a standard makes use of the Orthogonal Frequency Division Multiplex (OFDM) transmission scheme. The main feature of the OFDM scheme is that the information stream is not transmitted into a single carrier, but is divided into several sub-carriers, each transmitting at a much lower rate.

Furthermore, all these sub-carriers are orthogonal, i.e., they overlap their spectra, but do not cause mutual interference.

The fact that the different sub-carriers overlap their spectra makes one of the main operations at the receiver especially difficult: synchronization. In a receiver, the synchronizer is the block responsible for detecting the incoming frame and for estimating and correcting possible frequency offsets. The synchronization process is also responsible for providing a reference channel estimation to the channel estimation block. It further decides the starting point from which on the different OFDM symbols will be fed into the FFT block. The correct reception of OFDM signals is very sensitive to the synchronizer performance.

In the OFDM transmissions considered here, the information is not transmitted continuously, but in bursts. Each burst contains a single frame, which is a compound of different OFDM symbols.

In an OFDM transmission each data packet consists of a preamble and a data carrying part The preamble symbols are placed at the very beginning of each frame during transmission. The preamble consists of 10 "short" identical known OFDM symbols concatenated with 2 "long" identical and known OFDM symbols. The preamble symbols have a very specific periodic structure in the standard IEEE 802.11a to simplify synchronization. The data carrying part consists of a variable number of OFDM symbols, where each OFDM symbol contains useful information plus some known pilot sub-carriers, which are typically used for phase tracking.

Synchronization comprises the following operations: Frame detection, carrier frequency offset determination, symbol timing estimation, extraction of the reference channel, and data reordering. The synchronization process is data-aided, i.e., based on the digital processing of the preamble symbols.

During reception, the synchronizer has to peer at the channel in order to detect an incoming packet or frame. Frame detection in a receiver is an especially difficult task because there is no time raster that governs the transmission of the frames. In other words, the receiver does not know when to expect an incoming frame. The object of frame detection is to determine the symbol boundary so that correct samples for a frame can be taken. A major problem in the use of OFDM is therefore the determination of the time instant, at which the receiver starts sampling a new frame. A mismatch in the determination of this parameter would introduce a phase error causing intercarrier interference (ICI).

A method for frame detection in an OFDM signal is described by Chiu Ct al. (Yun, Chiu, Dejan Markovic, Haiyun Tang, Ning Zhang, OFDM receiver Design, published at URL: http://bwrc.eecs.berkeley.edu/People/ Grad_Students/dejan/ee225c/ofdm.pdf). It uses the first ten short symbols transmitted at the beginning of an OFDM frame, also referred to as the "short training sequence". The waveform of the short symbols is known and stored in the receiver device. The receiver performs a correlation of the sampled signal with the stored waveform. It further performs and autocorrelation of the sampled signal with the delay of one short symbol. While the autocorrelation creates a first signal with a plateau over a time span during which short symbols are received, the correlation with the known waveform creates a second signal exhibiting peaks. The last peak of the second signal occurring during a plateau in the first signal is chosen as a time reference to start frame detection.

However, in the solution proposed by Chiu et al. the frame detection does not work if a fading channel is affecting the signal.

Another method is described in Schwoerer, L.; Wirz, H.; "VLSI Implementation of IEEE 802.11a Physical Layer". Proceedings of the 6th International OFDM-Workshop (InOWo) 2001, pp. 28.1-28.4, September 2001, Hamburg, Germany. To detect the periodicity of the short training sequence, a sum of the absolute amount of three delayed autocorrelation terms over three different, overlapping time spans is calculated and then compared to a threshold value that is scaled with the signal power over the same time spans.

The solution proposed by Schwoerer et al. correspondingly makes use of three autocorrelators for the frame detection. This implies a rather large silicon area necessary for implementation of their solution and a high power consumption.

SUMMARY OF THE INVENTION

It is an object of the invention to provide a simple and reliable method and device for detection of the reception of a data frame in an input signal.

It is a further object of the invention to provide a synchronizing method and a synchronizer with a simple and reliable frame detector.

According to a first aspect of the invention a method for detection of the reception of a data frame in an input signal ($y_{OFF}(n)$) is provided. The method is based on the fact that the data frame comprises periodically repeated symbols at the beginning. The method of the first aspect of the invention comprises the steps of a) sampling said input signal ($y_{OFF}(n)$) with a predetermined sampling rate, b) generating a first signal ($|J(k)|^2$) that is dependent on an autocorrelation of said input signal with a delayed copy of said input signal, c) detecting a plateau in said first signal ($|J(k)|^2$), and generating an output signal that is indicative of detecting said plateau.

In the method of first aspect of the invention, step c), i.e., detecting a plateau, comprises a step of generating a differentiator signal ($J_{diff}(k)$), which is dependent on the difference of a first sample of the first signal and a second sample of the first signal that was taken a predetermined number of sampling periods earlier. Further, step c) comprises a step of detecting an absolute maximum of said differentiator signal ($J_{diff}(k)$) within a predetermined range of sampling periods.

The method of the invention makes use of the fact that a plateau in an autocorrelation signal, i.e., in the first signal, can be detected reliably by making use of a differentiation of the autocorrelation signal with a limited bandwidth. As is known, a plateau in the autocorrelation signal is indicative of the reception of a frame with periodically repeated symbols in the input signal.

The invention is based on the finding that a real differentiation, that is, a differentiation with a limited bandwidth, will transform an input signal into an output signal that exhibits an absolute maximum at the onset of a plateau of the input signal. In the method of the invention, the input to the real differentiation is the autocorrelation signal, and the output signal is the differentiator signal. The bandwidth of the differentiation can be limited for instance by calculating the difference of the respective two autocorrelation signals involved with a predetermined delay of a number of sampling periods.

A maximum of the differentiator signal can be detected with precise timing in a simple and reliable manner with an appropriate peak detection method.

An ideal differentiator, that is, a differentiator with an unlimited bandwidth, would show a discontinuity at the onset of a plateau, assuming that no noise was present in the signal.

It is noted that the term signal as used herein denotes, depending on the context, analog signals or digital signal, for instance binary representations of values of quantities, such as for instance a digital representation of a number indicating the current value of an autocorrelation of the input signal with its delayed copy.

The step of generating said differentiator signal ($J_{diff}(k)$) comprises for instance a step of delaying the first signal ($|J(k)|^2$) for the first predetermined number of sampling periods, and a step of generating a difference signal that is dependent on the difference between the first signal ($|J(k)|^2$) of a current sampling period and the delayed first signal ($|J(k)|^2$).

In a preferred embodiment of the invention, the autocorrelation step (step b) comprises the steps of delaying the input signal by a third predetermined number ($N_d$) of sampling periods, transforming the input signal into a second signal that is dependent on the complex conjugate of the input signal, and generating a fourth signal that is dependent on the product of said second signal and of said delayed input signal. Preferably, an autocorrelation signal is generated that is dependent on a sum of a fourth predetermined number $N_{avg}$ of autocorrelation signals.

To accomplish the calculation of the sum, a fourth signal can be saved for $N_{avg}$ sampling periods. The autocorrelation signal is created by adding said fourth signal of a current sampling period to said autocorrelation signal of a last previous sampling period and subtracting one fourth signal, that was saved $N_{avg}$ sampling periods earlier. Preferably then, the first signal is obtained as the product of the autocorrelation signal and its complex conjugate.

In a further preferred embodiment, the step of detecting an absolute maximum of the differentiator signal within a second predetermined number of sampling periods comprises an instantaneous peak detection step and a step of detecting a falling slope in the differentiator signal. Preferably, these two steps are performed in parallel. Instantaneous peak detection refers to the detection of a relative peak in the differentiator signal. The detection of a relative peak at the same time a falling slope occurs is an indication of the occurrence of an absolute maximum in the signal within the second predetermined number of sampling periods. In this embodiment, the detection of an absolute maximum in the differentiator signal is implemented with a simple and reliable method.

Instantaneous peak detection involves, for instance, comparing the differentiator signal ($J_{diff}(k)$) of a current sampling period with the differentiator signal ($J_{diff}(k)$) of a last, i.e., a next previous sampling period, and a step of saving the differentiator signal ($J_{diff}(k)$) of the current sampling period to a register, given the condition that its value is larger than that of the differentiator signal ($J_{diff}(k)$) of the previous sampling period. The register therefore always contains the largest differentiator signal.

Preferably, a step of incrementing a count index by one is performed, if the value of said differentiator signal ($J_{diff}(k)$) of the current sampling period is equal or smaller than that of said differentiator signal ($J_{diff}(k)$) saved in said register. A (third) signal can be generated indicative of the condition whether or not the count index has reached a predetermined value. The third signal indicates that a relative peak has been found within the sample range defined by the predetermined counter value, which can be the counter limit. The relative maximum is the value contained in the register.

Detection of a falling slope in the differentiator signal ($J_{diff}(k)$) is preferably performed by a group peak detection method. That means, the differentiator signal is accumulated in groups of six samples and the present group is compared with the previous one. If the present group is smaller than the previous one, the falling slope has started. In detail, an accumulation signal is generated that is dependent on the sum of the differentiator signal ($J_{diff}(k)$) over a predetermined accumulation number of consecutive sampling periods. The current accumulation signal is compared with the last previous accumulation signal representing (without overlap) the accumulation number of consecutive earlier sampling periods. If the value of the current accumulation signal is smaller than the value of the earlier accumulation signal, a group peak detection signal is generated. In an alternative embodiment, the group peak detection is a binary signal that is for instance "0" if the current accumulation signal is larger, and "1" if the current accumulation signal is smaller than the previous one. The group peak detection signal thus indicates that the differentiator signal is decreasing.

A maximum detection signal can be generated if the instantaneous peak detection signal indicates that the count index has reached the predetermined count value and the group peak detection signal indicates that the value of the current accumulation signal is smaller than the value of the earlier accumulation signal. Preferably, the maximum detection signal is the output signal.

It is noted that with the peak detection algorithm described above the plateau will be detected with a small delay due to the instantaneous peak detection method. The delay corresponds to the predetermined count value used in the instantaneous peak detection. However, this delay has no influence on the result of the following steps in the synchronization.

Preferably, the input signal is amplified such that the power of the amplified input signal is in a predetermined power range. The purpose of this step is to adapt the input power to a power level according to the conversion range of Analog-Digital converters. In order to avoid detecting a plateau in pure noise, the step of detecting a plateau in the first signal ($|J(k)|^2$) is preferably performed only if the first signal $|J(k)|^2$ exceeds a predetermined threshold value.

The method of the invention is preferably used for detecting a data frame containing OFDM symbols.

According to a second aspect of the invention, a frame detector is provided for detecting the reception of a data frame in an input signal ($y_{OFF}(n)$), said data frame comprising periodically repeated symbols at the beginning. The frame detector has a) a sampling unit adapted to sample said input signal ($y_{OFF}(n)$) with a predetermined sampling rate,
b) an autocorrelation unit adapted to transform said input signal ($y_{OFF}(n)$) into a first signal ($|J(k)|^2$) that is dependent on an autocorrelation of said input signal with a delayed copy of said input signal,
c) a plateau detector, adapted to detect a plateau in said first signal ($|J(k)|^2$), and
d) an output unit adapted to generate an output signal that is indicative of detecting said plateau.

The plateau detector is adapted to generate a differentiator signal ($J_{diff}(k)$), which is dependent on the difference of a first sample of said first signal and a second sample of said first signal a predetermined number of sampling periods earlier, to detect an absolute maximum of said differentiator signal ($J_{diff}(k)$) within a predetermined range of sampling periods, and to provide a signal indicative of detecting said absolute maximum to said output unit.

The frame detector of the second aspect of the invention implements the frame detection method of the first aspect of the invention. In what regards advantages reference is made to the above description of the method of the invention.

A preferred embodiment of the frame detector of the second aspect of the invention implements the plateau detection method according to the preferred embodiment of the method of the invention described earlier. Preferably, said plateau detector of the frame detector comprises a peak detection unit with a first detection unit connected to the input port and comprising a first memory unit. The first detection unit is adapted to compare the input signal (Jdiff (k)) received through the input port with a first entry contained in the first memory unit, and to replace the first entry by the input signal if the value of the input signal (Jdiff (k)) is larger than the value of the first entry. The first detection unit implements the instantaneous peak detection method.

In this embodiment, there is preferably a second detection unit connected to the input port and comprising a second memory unit. The second detection is adapted to generate an accumulation signal that is dependent on the sum of the differentiator signal ($J_{diff}(k)$) over a fourth predetermined number of consecutive sampling periods, to compare the current accumulation signal with the last previous accumulation signal representing without overlap the fourth predetermined number of consecutive earlier sampling periods, and to generate a group peak detection signal indicative of whether or not the value of the current accumulation signal is smaller than the value of the earlier accumulation signal.

Further preferred embodiments of the frame detector implement preferred embodiments of the frame detection method described earlier. From that description it is obvious to a person skilled in the art how to implement the preferred embodiments of the frame detector.

It is noted that the peak detection method as well as the peak detection unit used in the present context for detecting a plateau in the autocorrelation signal can be used for peak detection in any signal. The peak detection method as well as the peak detection unit represent an independent invention.

According to a third aspect of the invention, a synchronizing method is provided. The synchronizing method comprises a step of frame detection, which is carried out using the method of the first aspect of the invention or any of its embodiments described above or in the dependent claims.

A carrier frequency offset, which is due to a frequency mismatch during RF downconversion, introduces an unknown phase factor to each signal sample. This unknown phase factor must be estimated and compensated for each sample before performing a Fast Fourier Transform (FFT) at the receiver. Otherwise the orthogonality between subcarriers is lost. A loss of orthogonality is also creates intercarrier interference.

A preferred embodiment of the synchronizing method of the third aspect of the invention therefore further comprises a step of estimating a relative frequency offset ($f_\epsilon$) in an input signal ($y_{OFF}(n)$), wherein the estimating step comprises the steps of a) estimating a coarse frequency offset, and ($\beta$)
b) estimating a fine frequency offset ($\alpha$) in dependence of said estimated coarse frequency offset ($\beta$).

In this embodiment, the steps of estimating a coarse frequency offset ($\beta$) and/or of estimating a fine frequency offset, i.e., step a) or b) or both steps a) and b), preferably comprise a step of calculating a phase value of said first signal ($|J(k)|^2$).

The step of estimating the frequency offset comprises in one embodiment a step of assigning a fine frequency offset value dependent on the value of the coarse frequency offset according to the following function:

$$\epsilon = \alpha; \text{ if } (-0.1)/4 \leq \beta \leq (0.1)/4 \quad (R1)$$

$$\epsilon = \alpha; \text{ if } \alpha \geq 0 \text{ and } (0.1)/4 < \beta < (0.9)/4 \quad (R2)$$

$$\epsilon = 1 + \alpha; \text{ if } \alpha < 0 \text{ and } (0.1)/4 < \beta < (0.9)/4 \quad (R3)$$

$$\epsilon = 1 + \alpha; \text{ if } \beta \geq (0.9)/4 \quad (R4)$$

$$\epsilon = -1 + \alpha; \text{ if } \alpha \geq 0 \text{ and } (-0.9)/4 < \beta < (-0.1)/4 \quad (R5)$$

$$\epsilon = \alpha; \text{ if } \alpha < 0 \text{ and } (-0.9)/4 < \beta < (-0.1)/4 \quad (R6)$$

$$\epsilon = -1 + \alpha; \text{ if } \beta \leq (-0.9)/4 \quad (R7)$$

In an alternative embodiment that is slightly more robust to noise than the embodiment just described the step of assigning a fine frequency offset value dependent on the value of the coarse frequency offset is performed according to the following function:

$$\epsilon = \alpha; \text{ if } (-0.25)/4 \leq \beta \leq (0.25)/4 \quad (R1)$$

$$\epsilon = \alpha; \text{ if } \alpha \geq 0 \text{ and } (0.25)/4 < \beta < (0.75)/4 \quad (R2)$$

$$\epsilon = 1 + \alpha; \text{ if } \alpha < 0 \text{ and } (0.25)/4 < \beta < (0.75)/4 \quad (R3)$$

$$\epsilon = 1 + \alpha; \text{ if } \beta \geq (0.75)/4 \quad (R4)$$

$$\epsilon = -1 + \alpha; \text{ if } \alpha \geq 0 \text{ and } (-0.75)/4 < \beta < (-0.25)/4 \quad (R5)$$

$$\epsilon = \alpha; \text{ if } \alpha < 0 \text{ and } (-0.75)/4 < \beta < (-0.25)/4 \quad (R6)$$

$$\epsilon = -1 + \alpha; \text{ if } \beta \leq (-0.75)/4 \quad (R7)$$

Preferably, after estimation the frequency offset, a step of correcting the input signal by the estimated value is performed.

A further embodiment of the synchronizing method of the invention comprises after said step of frequency offset correction a step of estimating the time of reception of at least one symbol contained in a received data frame (hereinafter referred to as a symbol timing step).

The symbol timing step preferably comprises a step of generating a crosscorrelation signal, which is dependent on the value of the crosscorrelation of the corrected input signal with a known reference signal, wherein the reference signal is a first section of long preamble symbols included in the data frame. In a preferred embodiment, the reference signal is 32 samples long.

Another embodiment comprises a step of estimating a reference channel, preferably using a step of performing a Fast Fourier Transform of a second section of the long preamble symbols included in the data frame.

According to a fourth aspect of the invention, a synchronizer device is provided. The synchronizer device comprises a frame detector according to an embodiment of the frame detector of the second aspect of the invention.

The synchronizer device preferably further comprises a symbol timing unit adapted to generate a crosscorrelation signal, which is dependent on the value of the crosscorrelation of the corrected input signal with a known reference signal, wherein the reference signal is a first section of long preamble symbols included in the OFDM frame.

The symbol timing unit comprises in one embodiment a crosscorrelation unit with a number of multipliers for complex numbers, and wherein at least one multiplier is made of a combination of XNOR-gates, inverter gates and adders.

To save power, the frame detection unit and the symbol timing unit can in one embodiment be enabled or disabled individually. This is preferably implemented by means to enable or disable the clock for the individual unit. It is noted that one clock is used for both units.

BRIEF DESCRIPTION OF THE DRAWINGS

In the following, a preferred embodiment of a synchronizer device according to the invention will be described with reference to the figures.

DESCRIPTION OF PREFERRED EMBODIMENTS

Figure 1:
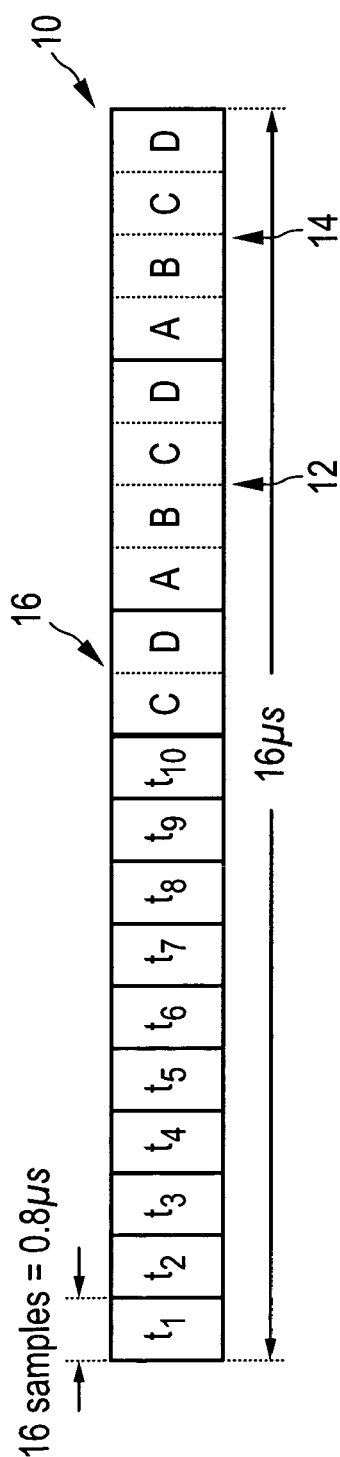
FIG. 1 shows the preamble symbols used in the IEEE 802.11a standard.

FIG. 1 shows the structure of a preamble 10 of a frame used in the IEEE 802.11a standard. It is composed of ten short preamble symbols referred to as $t_1, \ldots, t_{10}$, each having a length of 0.8 µs. A short preamble symbol is sampled 16 times. Furthermore, there are two long preamble symbols 12 and 14 (ABCD-ABCD) with a double cyclic prefix 16 (CD), thus resulting in the structure CD-ABCD-ABCD of the second section of the preamble. The full preamble as shown has a duration of 16 µs. 8 µs is the duration of the short ten preamble symbols, and 8 µs is the duration of the long preamble symbols with the cyclic prefix.

In the following, an embodiment of a frame detector is described in detail. The description also gives a clear picture of an embodiment of a method for frame detection that is implemented in the frame detector.

Figure 2:
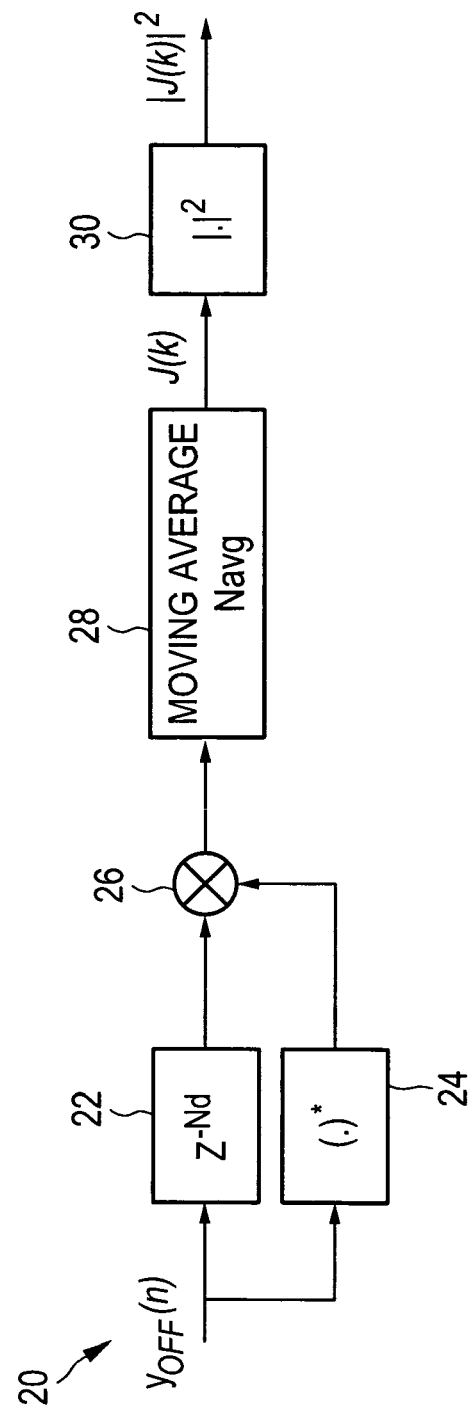
FIG. 2 shows a scheme of a general delayed autocorrelator.

During synchronization the reception of a frame is to be detected. This detection is based on the particular periodic structure of the preamble symbols. The circuit used for this purpose is sketched in FIG. 2, representing a scheme of a general delayed autocorrelator 20. It is based on an autocorrelation of the input signal with a delayed version of itself.

The autocorrelator has a delay block 22 introducing a delay of $N_d$ clock cycles to an input signal $y_{OFF}(n)$. In parallel to delay block 22 a conjugator block 24 is provided that generates a complex conjugate of the input signal $y_{OFF}(n)$. The output signals of the delay block 22 and of the conjugator block 24 represent the input signals to a multiplication stage 26. The output of multiplication stage 26 is fed into a moving average block 28 that will be explained in further detail with reference to FIG. 3. The moving average of the input signal of block 28 consists of the addition of the most recent $N_{avg}$ samples. The output signal J(k) of moving average block 28 is fed into a block 30 that provides at its output the absolute amount of its input signal.

The output of the autocorrelation block can be expressed as $$J(k) = \sum_{l=0}^{N_{avg}-1} y^*_{OFF}(l-k) \cdot y_{OFF}(l-k-N_d) \quad (1)$$

Two parameters are important here: $N_d$ and $N_{avg}$. The former ($N_d$) is the length of the delay introduced by delay block 22 and the latter ($N_{avg}$) is the length of the moving average block.

The selected value for $N_d$ directly depends on the periodicity found in the preamble. From FIG. 1, several periodicities are possible, i.e. 16, 32, 48, 64 and 80 samples. Generally, the value for $N_{avg}$ is selected to be the same as $N_d$.

Figure 3:
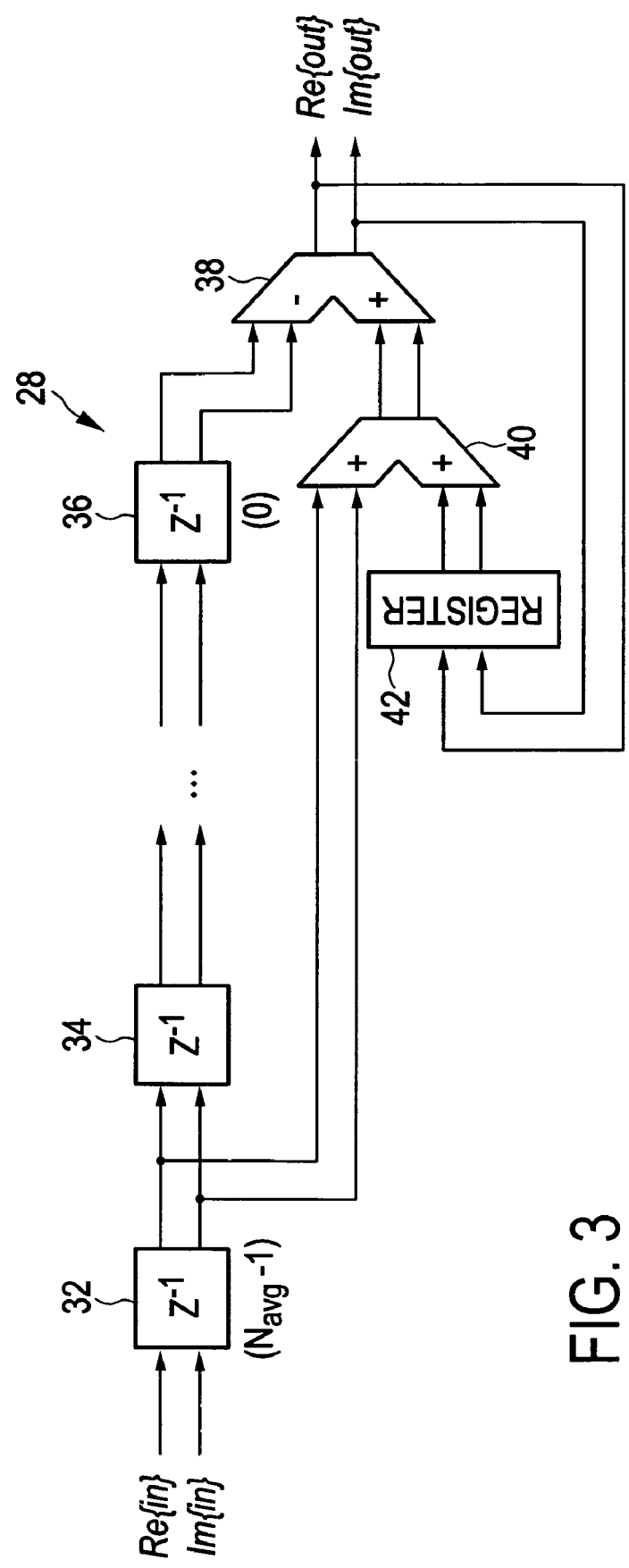
FIG. 3 shows a detailed scheme of a moving average block in the autocorrelator of FIG. 2.

FIG. 3 shows a detailed scheme of the moving average block 28 in the autocorrelator. Its structure is like that of in a Finite Impulse Response (FIR) filter, but with the advantage that all the coefficients are one. Thus, it is not necessary to add all the $N_{avg}$ samples stored inside the register each time when a new sample comes in, but only add the new sample and subtract the oldest one.

The structure of the moving average block sketched in FIG. 3 comprises $N_{avg}$ delay elements, three of which are shown with reference signs 32, 34, and 36. Each delay element introduces a delay of one clock cycle. Delay element 32 is the first delay element in the signal flow, delay element 34 the second, and delay element 36 the last. Each of the delay elements works with a complex sample. The output of the last delay element 36 in the signal flow is fed as the subtrahend into a subtractor 38. Subtractor 38 receives a second input from an adder 40. Adder 40 adds the current content of a register 42 and the output of the first delay element 32. Register 42 contains the last output of subtractor 38.

Figure 4:
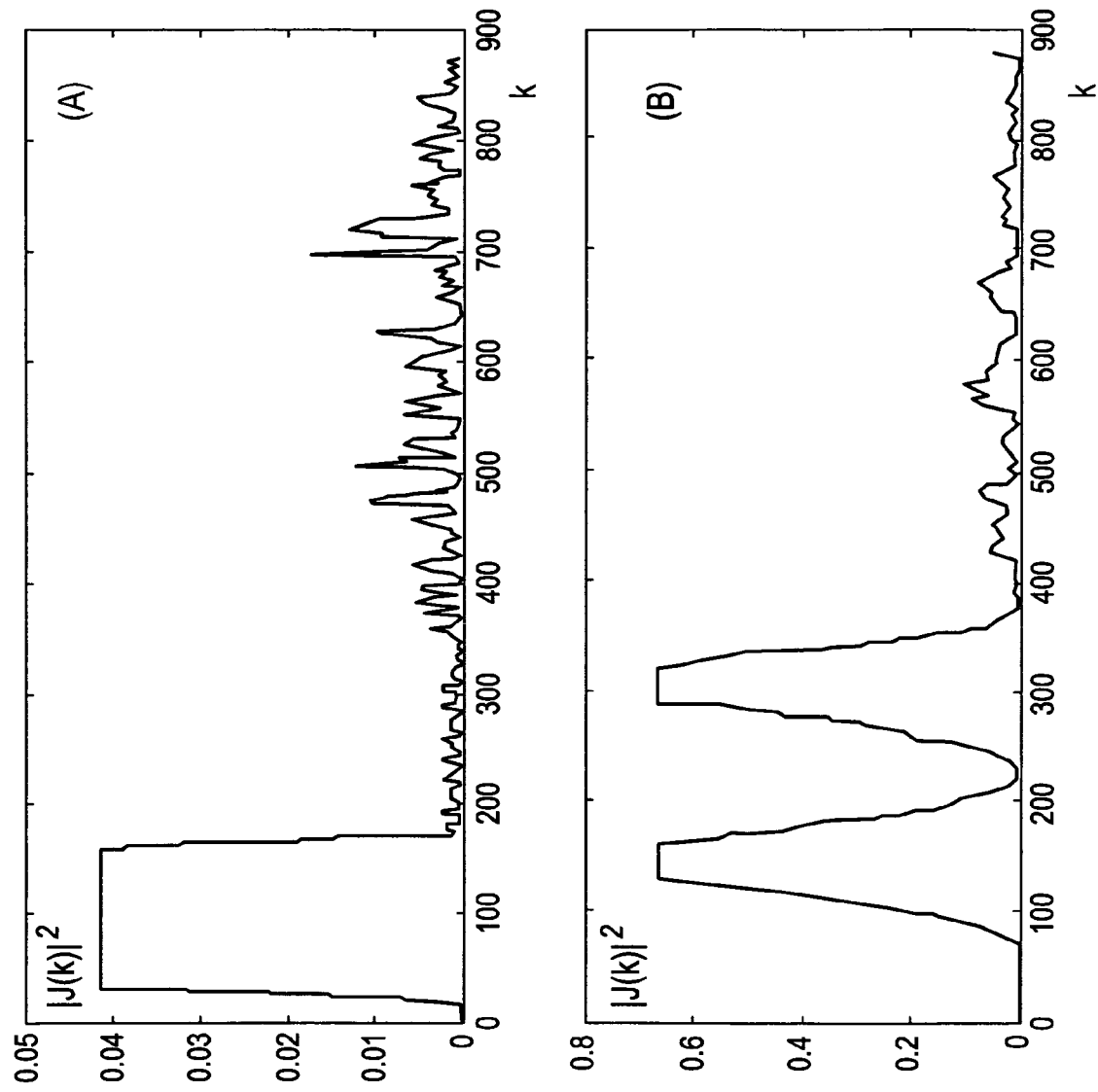
FIG. 4 shows a signal at the output of the delayed autocorrelator for two possible values for $N_d$ keeping $N_{avg}=N_d$.

FIG. 4 shows a signal at the output of the delayed autocorrelator 20 for two possible values for $N_d$, keeping $N_{avg}=N_d$. In FIG. 4, the signal $|J(k)|^2$ is represented as a function of sample index, i.e. as a function of time, for $N_d=16$ (FIG. 4(A)) and $N_d=64$ (FIG. 4(B)). The output J(k) is complex, and so the square magnitude $|J(k)|^2$ is represented. It can be observed that $|J(k)|^2$ shows a region with a constant value (plateau) for a number of samples. In both cases $N_d=16$ and $N_d=64$, several regions showing a plateau are found. The length and position of the plateau directly depends on $N_d$. The plateau is longer and occurs earlier for $N_d=16$.

For reasons that we will clarify in the next section, when explaining the carrier frequency offset estimation, the embodiment described here uses $N_d=64$ and $N_{avg}=N_d$. The procedure to detect the frame is based on a plateau detection algorithm for the signal $|J(k)|^2$ (see FIG. 4 (B)).

Figure 5:
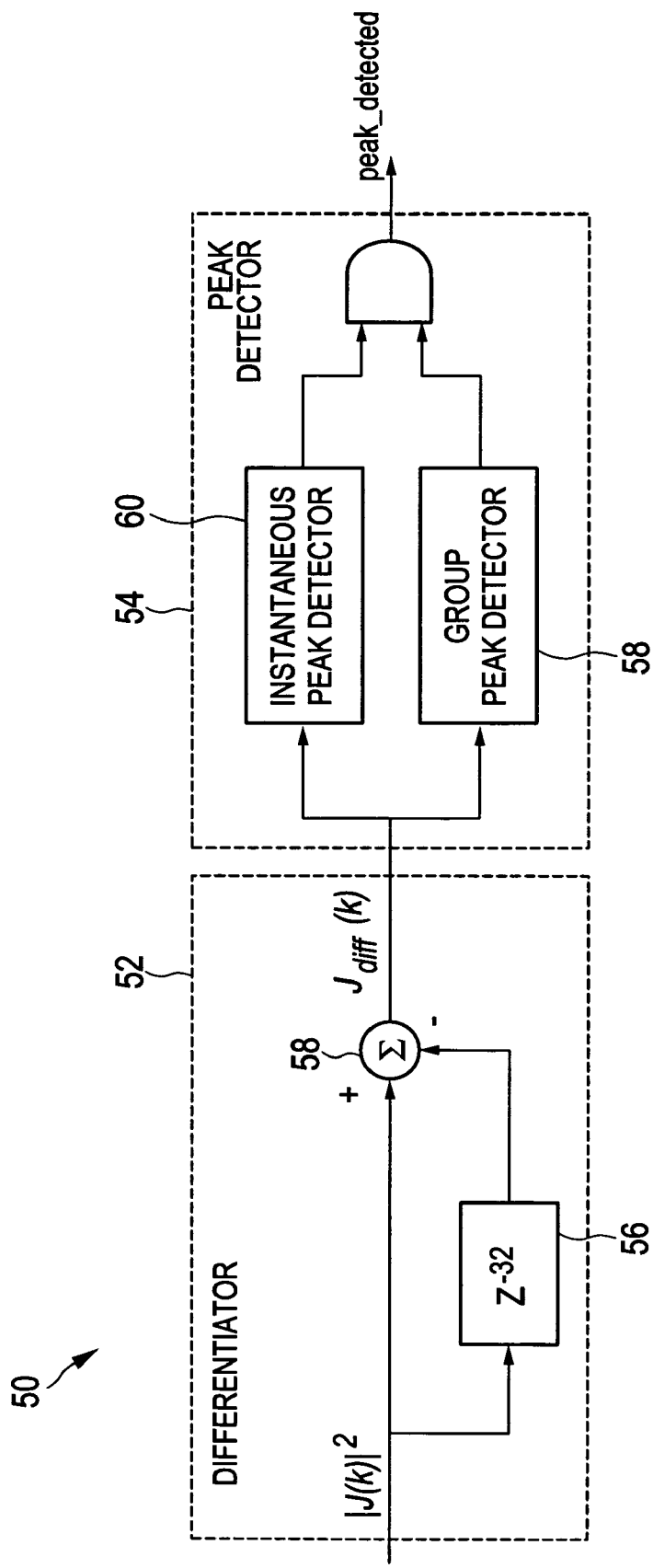
FIG. 5 shows a structure of an embodiment of a plateau detector.

FIG. 5 shows a structure of an embodiment of a plateau detector 50. The plateau detector 50 is separated into a differentiator block 52 and a peak detector block 54. Making use of a differentiator, the plateau detector 50 implements an algorithm that tries to find out the point where the first plateau starts. This is done according to the following principle: At the onset of a plateau, the function $|J(k)|^2$ is not differentiable and an ideal differentiator would show a discontinuity. A real differentiator has a limited bandwidth and so the discontinuity may not happen. In addition, as we are interested in a noise-robust system, this bandwidth has to be as small as possible. As the plateau is 32 samples long, we decided to use the differentiator shown in FIG. 5 for the present embodiment, which is based on a delay line 56 of length 32 together with a subtractor 58.

The peak detection block 54 is divided into two sub-blocks: group peak detector 58 and instantaneous peak detector 60. The structure of the peak detector block 54 will be explained in detail below with reference to FIG. 8.

Figure 6:
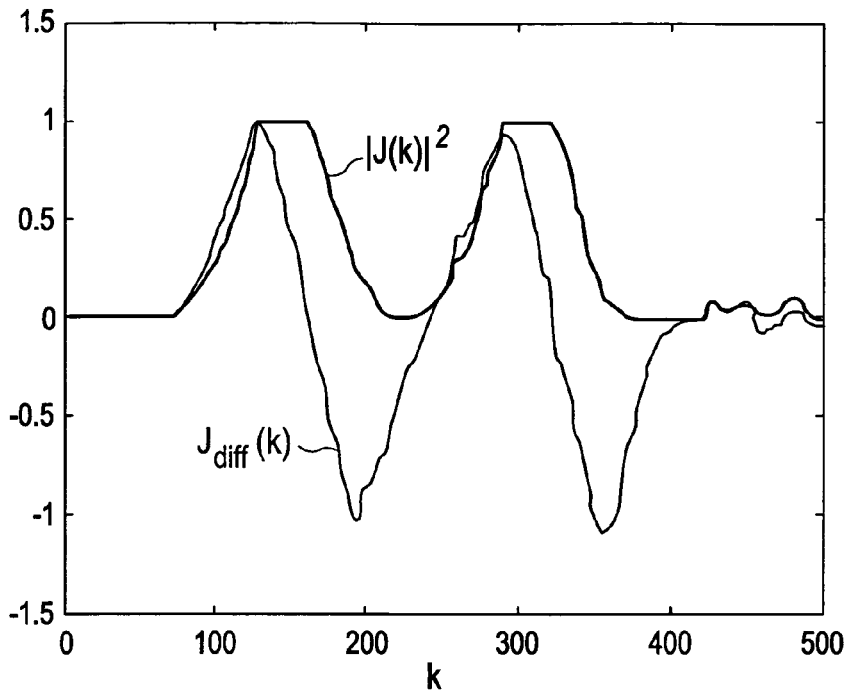
FIG. 6 shows a sketch of the signal $J_{diff}(k)$ at the output of the differentiator.

FIG. 6 shows a sketch of the signal $J_{diff}(k)$ at the output of the differentiator block 52, when the input $|J(k)|^2$ is as in FIG. 4 (B) with $N_d=64$. Both signals $J_{diff}(k)$ and $|J(k)|^2$ are shown in FIG. 6 on the same relative scale as a function of clock cycle (i.e., time) k. Interestingly, a peak is found at the output of this differentiator 52 at that point where the first plateau in $|J(k)|^2$ starts. This is the main reason why a peak detector algorithm is applied at the output of the differentiator.

The autocorrelation block 20 together with the differentiator 52 and the peak detector 54 will constantly peer at the channel. When the peak detector 54 identifies an absolute maximum, the synchronizer will consider that a new frame has arrived and the carrier frequency offset estimator will be activated. Because of the noise (thermal, digital), the peak detection will not be a trivial task, i.e. a smart peak detection algorithm will be necessary in order to distinguish the absolute from the relative maxima.

Figure 8:
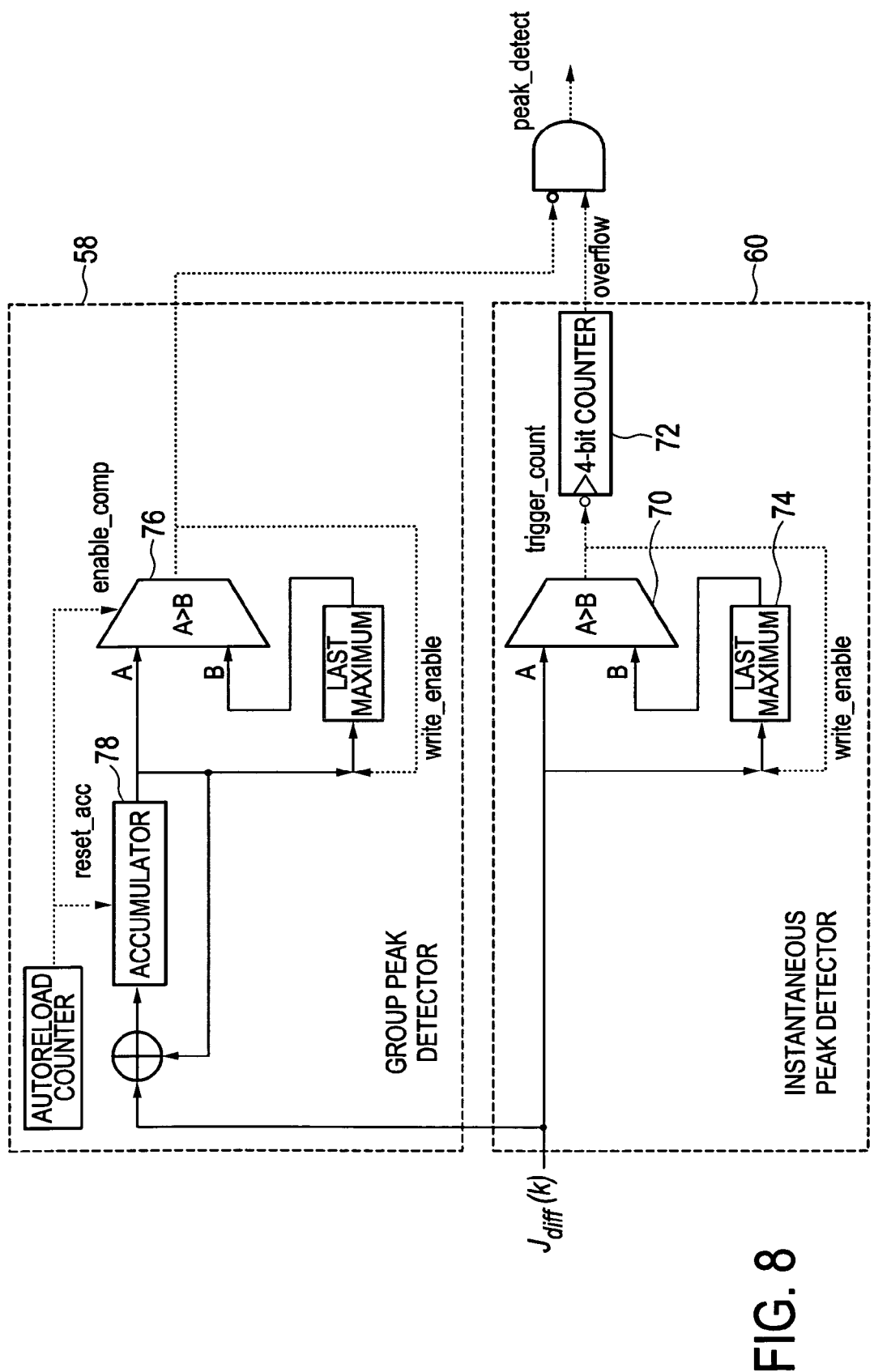
FIG. 8 shows a particular implementation of the peak detector.

FIG. 8 shows a more detailed block diagram of a particular implementation of the 54 peak detector.

The instantaneous peak detector 60 is composed of a comparator 70 and a counter 72. The present sample $J_{diff}(k)$ coming out from the differentiator 52 is compared with the last recorded maximum $J_{max}$ that is stored in a register 74. As long as the sample $J_{diff}(k)$ is bigger than $J_{max}$, the register 74 storing $J_{max}$ will be updated to contain the new sample $J_{diff}(k)$ as the latest maximum and the counter 72 will be reset If $J_{diff}(k)$ is smaller or equal than $J_{max}$, the counter 72 will be triggered and it will increase its count by one. If this situation remains until the counter 72 counts through its full range, the instantaneous peak detector 60 will generate a signal stating that a relative peak was found inside the counting scope of the counter 72. In the implementation of FIG. 8 a 4-bit counter is used, which makes a counting scope of 16.

The group peak detector 58 is used to detect falling slopes in $J_{diff}(k)$, and its main component is also a comparison block. If the group peak detector finds a falling edge at the same time as the instantaneous peak detector finds a relative peak, this means that the detected peak is actually an absolute peak.

In the group peak detector, the input signal $J_{diff}(k)$ is accumulated in groups of six samples (6-tuples) in an accumulator 78 and the present group is compared with the previous one. If it is smaller, it means that the falling slope has started.

Figure 7:
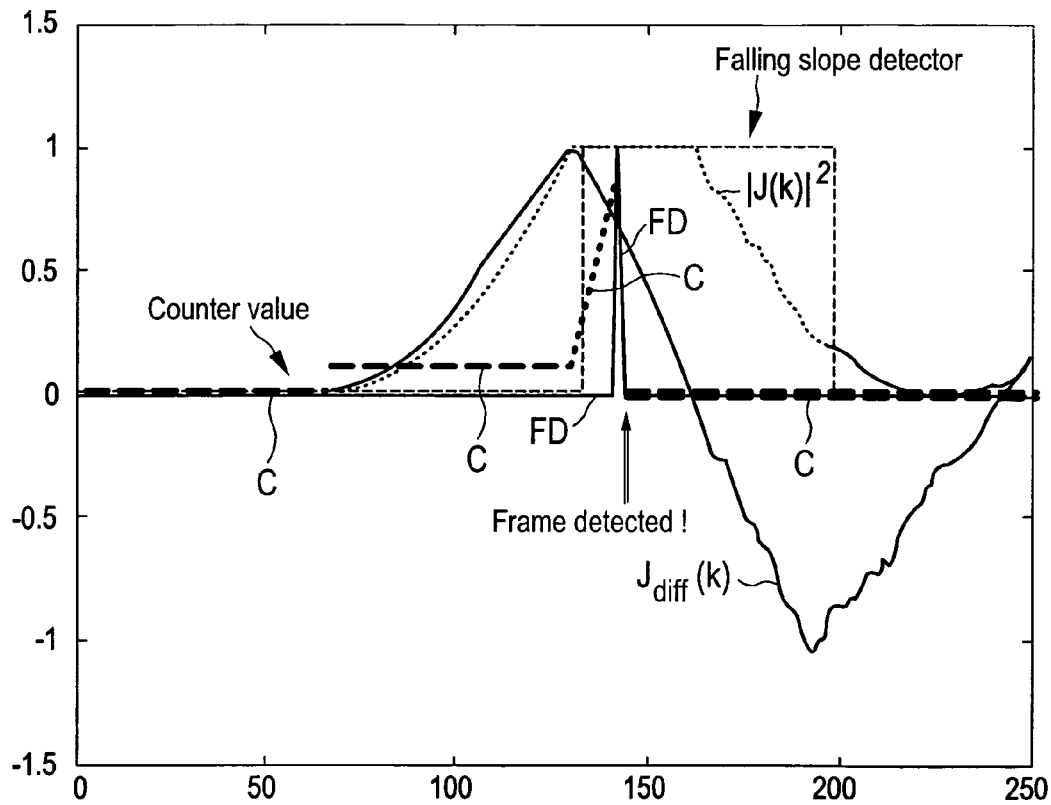
FIG. 7 shows a detailed scheme of the several signals involved in the peak detection procedure.

FIG. 7 shows a detailed scheme of the several signals involved in the peak detection procedure. A signal FS (dashed line) is given by the group peak detector (falling slope detector). The signal FS is zero until shortly after a peak has occurred in the signal $J_{diff}(k)$ (full line), which is shown here again as in FIG. 6. At this point it switches to the value 1. When $J_{diff}(k)$ is detected to increase again, the signal FS switches back to zero. A signal C indicates the value of the counter 72. The counter signal C exhibits an increasing slope after the detection of a peak in the signal $J_{diff}(k)$ until the full range of the counter is reached. After that, the signal C jumps back to zero.

A signal FD (fat full line) represents the point in time where a decision on the existence of a peak is taken. FD is zero and exhibits a short peak at the point the counter signal 72 reaches its full range and the signal FS indicates a falling slope.

We have to mention that a frame will be detected 16 samples after its actual starting point, i.e., the detection will occur in the middle of the first plateau in $|J(k)|^2$ (dotted line in FIG. 7). However, this fact does not pose any problem, and the reason for the same will be given in the next section, where we explain the carrier frequency offset estimation.

In the following, a device and method for carrier frequency offset estimation and correction are described with reference to FIGS. 9 to 11.

During the RF down-conversion, the local oscillator (LO) normally is not exactly tuned to the expected frequency, but it will show some offset. As the different sub-carriers in an OFDM system overlap, any frequency offset in the receiver side may lead to significant Inter-Carrier-Interference (ICI). Once the synchronizer has been fired after frame detection, the next operation will be the estimation of this frequency offset Here we recover the expression given in equation (1) for the autocorrelation J(k), considering that $$y_{OFF}(n) = y(n) \cdot e^{j2\pi f_c \frac{\Delta f}{f_s} n} \tag{2}$$

where $y_{oFF}(n)$ is the signal affected by a normalized frequency offset $f_\epsilon$. This normalization is with respect to the channel spacing $\Delta f$ in the OFDM signal, which is 312.5 kHz in the IEEE 802.11a standard. The parameter $f_S$ is the inverse of the FFT time ($f_S$=20 MHz in the standard under consideration). The signal J(k) may then be rewritten as $$J(k) = e^{-j2\pi f_\epsilon \frac{\Delta f}{f_S} N_d} \cdot \sum_{l=0}^{N_{avg}-1} y^*(l-k) \cdot y(l-k-N_d) \qquad (3)$$

If y(n) is a periodic signal with a period of $N_d$ samples, i.e. $y(n)=y(n-N_d)$, then (3) can be simplified to $$J(k) = e^{-j2\pi f_\epsilon \frac{\Delta f}{f_S} N_d} \cdot \sum_{l=0}^{N_{avg}-1} |y(l-k)|^2 \qquad (4)$$

From equation (4) it can be seen that the phase of J(k) is only due to $f_\epsilon$, and so $f_\epsilon$ could be found as follows $$f_\epsilon = \frac{f_S}{2\pi \cdot N_d \cdot \Delta f} \tan^{-1}(J^*(k)) \qquad (5)$$

However, there are several factors which destroy the periodicity, making $y(n) \neq y(n-N_d)$. The most important ones are the AGC settling time and the channel impulse response. Another factor is noise, but its effect can be largely compensated by the averaging $N_{avg}$ in equation (4). In addition, if $N_{avg}$ is a multiple of the minimum periodicity in the preambles (16 samples in this standard), $|J(k)|^2$ shows a plateau in the region where the phase of J(k) only depends on the carrier frequency offset.

Considering what has been stated above, the frequency offset is in the present embodiment estimated after calculation of the phase of J(k), at that point k where the peak detector established the beginning of the frame, because this point falls exactly in the middle of the plateau in $|J(k)|^2$.

Nevertheless, there is a limitation in the frequency offset estimation, which can be obtained by calculating the phase in the expression of equation (4), i.e.

$$-\pi \leq 2\pi f_\epsilon \frac{\Delta f}{f_S} N_d < \pi \qquad (6)$$

The ratio $\Delta f/f_S$ is 1/64 in the IEEE 802.11a standard. From (6) it can be seen that the range of possible estimated values for $f_\epsilon$ will only depend on the selected delay $N_d$ in the autocorrelator.

Figure 9:
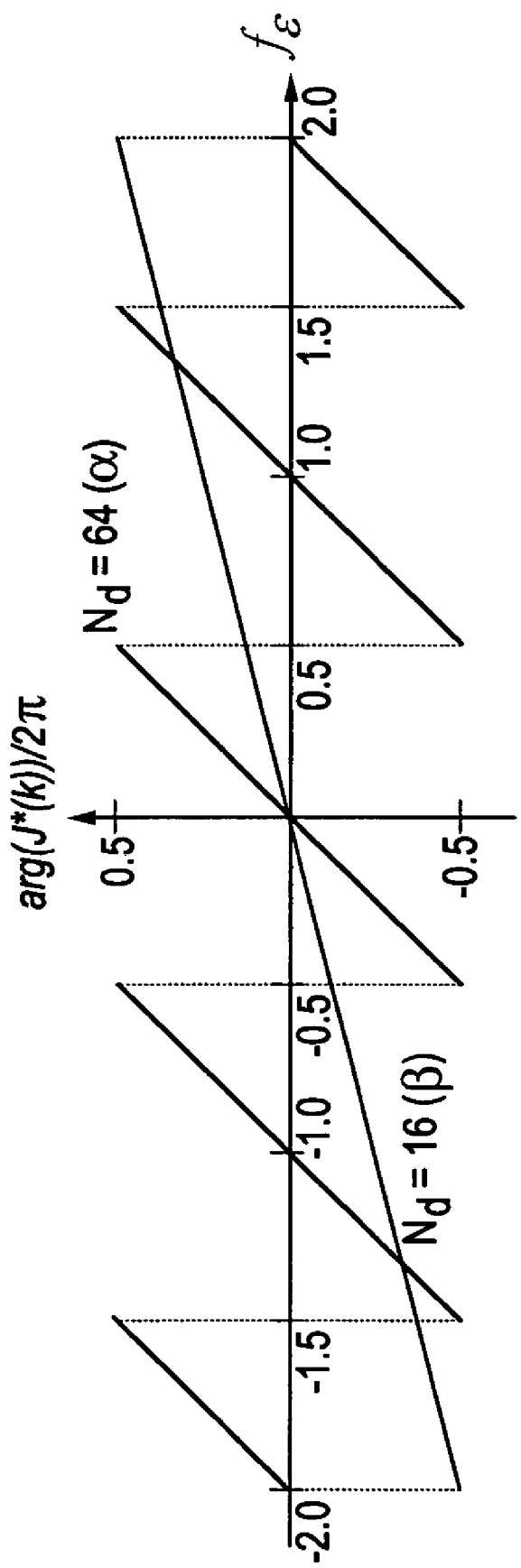
FIG. 9 shows the dependency of the phase of J*(k) with respect to the input carrier frequency offset (normalized) for two particular values of $N_d$

FIG. 9 shows the dependency of the phase of J*(k) (conjugate value of J(k)) with respect to the input carrier frequency offset $f_\epsilon$ (normalized) for two particular values of $N_d$. Afterwards these two values will be used to obtain two estimations for the frequency offset, $\alpha$ and $\beta$.

In our implementation, $f_\epsilon$ is supposed to have its value in the range ±1.5, i.e. a frequency offset of ±468.75 kHz in an oscillator working in the 5 GHz ISM band. If the oscillator is tuned at 5.6 GHz, this value of expected offset is about 85 ppm (parts-per-million).

We will estimate $f_\epsilon$ decomposing its value into two components $\alpha$ and $\beta$, and the actual estimation $\epsilon$ will be a function of these two components, i.e. $\epsilon=f(\alpha,\beta)$. The value of a is restricted to be in the range ±0.5, and so is called the fine frequency offset. The parameter $\beta$ is called coarse frequency offset, and it will be in the range ±2.0 (see FIG. 9). Our aim is to get proper estimations for these two parameters and combine them to finally obtain $\epsilon$. With the presented scheme used for frame detection it is possible to derive the value for $\alpha$.

Figure 10:
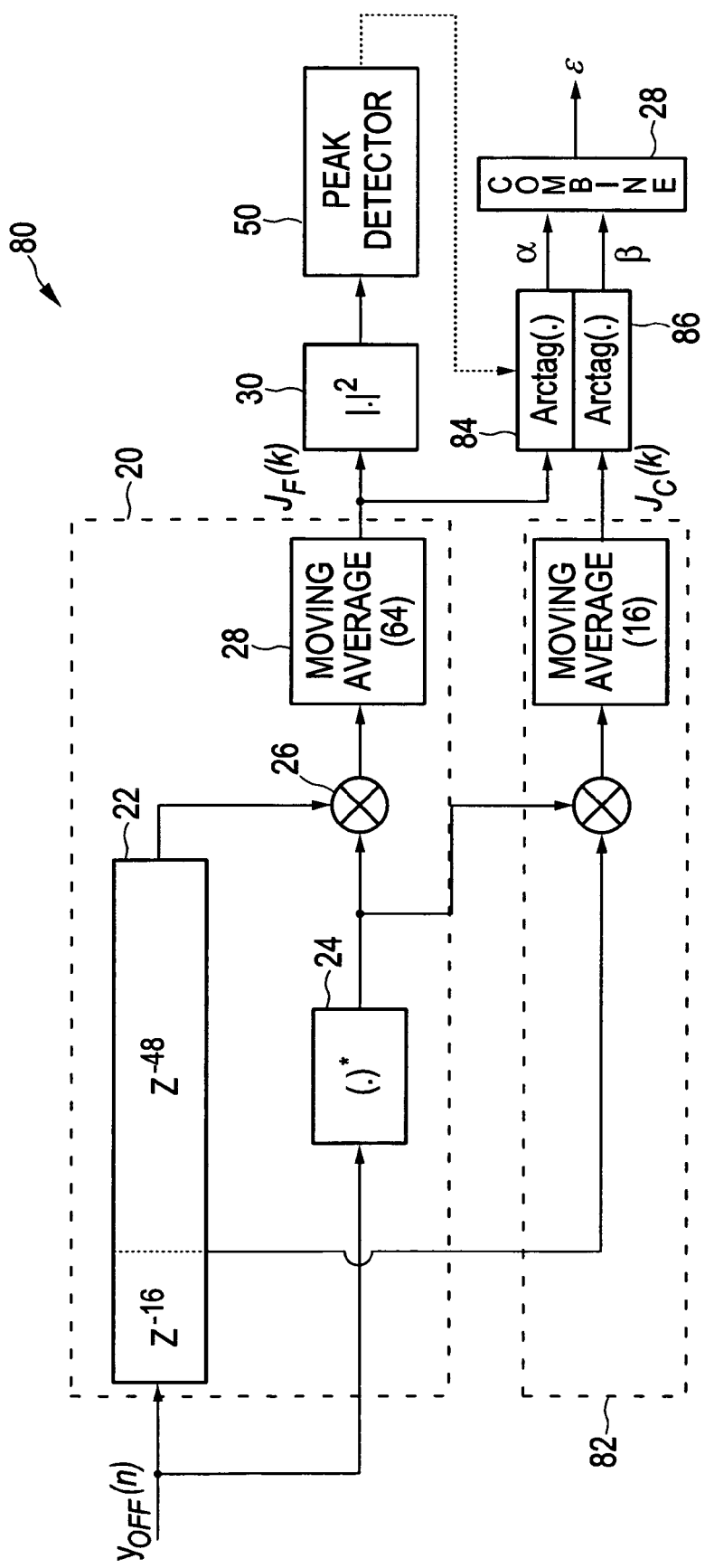
FIG. 10 shows a scheme of a frequency offset estimator used in the synchronizer device.

FIG. 10 shows an embodiment of a device 80 for frequency offset estimation and correction, which is based on the principles outlined above. In this device two delayed autocorrelators 20 and 82 are used. Both are used for the frequency offset estimation, but only autocorrelator 20 of FIG. 1 (with $N_d$=64) is also used for the frame detection. Autocorrelator 82 uses the signal after a delay of $N_d$=16.

We may estimate the value for $\alpha$ by calculating the phase an output of this autocorrelator 20, $J_F(k)$, which is the signal obtained before calculation its square amount The estimation of $\beta$ can be obtained using autocorrelator 82 with $N_d$=16 and $N_{avg}=N_d$ and calculating also the phase of its output $J_C(k)$.

The blocks 84 and 86 used to obtain $\alpha$ and $\beta$ perform an arctangent calculation. This complex mathematical operation can be efficiently realized by using the CORDIC algorithm working in the vectoring mode. Although two arctangent blocks have been shown in FIG. 10, only one is necessary in the actual implementation. After the frame has been detected by the peak detector 50, the two samples $J_C(k)$ and $J_F(k)$ will be stored in a register (not shown). The arctangent block 84, 86 will first calculate $\alpha$ from $J_F(k)$ and afterwards $\beta$ from $J_C(k)$. More details on the CORDIC algorithm and its implementation can be found in the German Patent 101 64 462.0.

The correction of the frequency offset is carried out considering the signal model given in eq. (2). To obtain the original signal y(n), the input signal $y_{oFF}(n)$ has to be multiplied by a phasor, which is the complex conjugate of the one found in eq. (2). This operation will be carried out by a Numerically Controlled Oscillator (NCO) 122, cf. FIG. 17, which is implemented using again the CORDIC algorithm, this time operating in the rotational mode.

The dependency of $\alpha$ and $\beta$ vs. $f_\epsilon$ was sketched in FIG. 9. There it can be seen that this dependency is not completely lineal, but shows some discontinuities. The reason for these discontinuities are the phase leaps from $+\pi$ to $-\pi$ at the complex exponential in eq. (4). Thus, the final value for $\epsilon$ cannot be a linear combination of the two estimations $\alpha$ and $\beta$. Thus one has to find a suitable way to combine $\alpha$ and $\beta$ in order to determine $\epsilon$.

From FIG. 9 it can also be seen that $\beta$ has no discontinuities throughout the entire range of expected values for $f_\epsilon$ (±1.5). Nevertheless, $\beta$ will be much more noisy than a since the moving average considers only 16 samples (see FIG. 10). For this reason, $\beta$ will provide a coarse approximation of the frequency offset, which will be further refined using $\alpha$.

The selected function $\epsilon=f(\alpha,\beta)$ is as follows $\epsilon=\alpha$; if $(-0.1)/4 \leq \beta \leq (0.1)/4$ (R1)

$\epsilon=\alpha$; if $\alpha \geq 0$ and $(0.1)/4 < \beta < (0.9)/4$ (R2)

$\epsilon=1+\alpha$; if $\alpha<0$ and $(0.1)/4 < \beta < (0.9)/4$ (R3)

$\epsilon=1+\alpha$; if $\beta \geq (0.9)/4$ (R4)

$\epsilon=\alpha$; if $\alpha<0$ and $(-0.9)/4 < \beta < (-0.1)/4$ (R5)

$\epsilon=-1+\alpha$; if $\alpha \geq 0$ and $(-0.9)/4 < \beta < (-0.1)/4$ (R6)

$\epsilon=-1+\alpha$; if $\beta \geq (-0.9)/4$ (R7)  (7)

In an alternative embodiment, the selected function is as follows:

$\epsilon = \alpha$; if $(-0.25)/4 \leq \beta \leq (0.25)/4$ (R1)

$\epsilon = \alpha$; if $\alpha \geq 0$ and $(0.25)/4 < \beta < (0.75)/4$ (R2)

$\epsilon = 1+\alpha$; if $\alpha < 0$ and $(0.25)/4 < \beta < (0.75)/4$ (R3)

$\epsilon = 1+\alpha$; if $\beta \geq (-0.75)/4$ (R4)

$\epsilon = -1+\alpha$; if $\alpha \geq 0$ and $(-0.75)/4 < \beta < (-0.25)/4$ (R5)

$\epsilon = \alpha$; if $\alpha < 0$ and $(-0.75)/4 < \beta < (-0.25)/4$ (R6)

$\epsilon = -1+\alpha$; if $\beta \leq (-0.75)/4$ (R7)  (8)

Figure 11A:
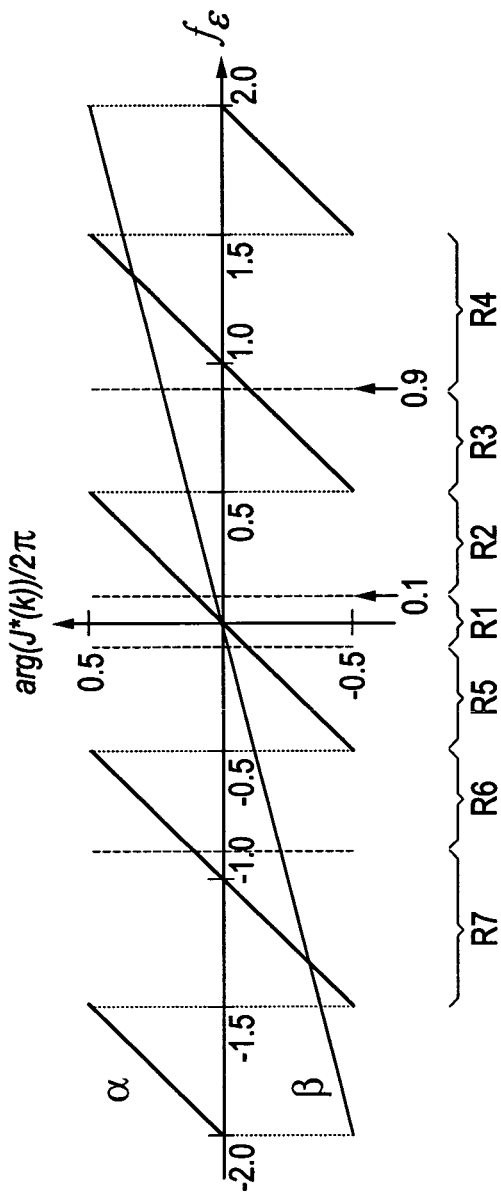
FIG. 11 shows the different decision regions for the combination of α and β in the frequency offset estimation and correction.
Figure 11B:
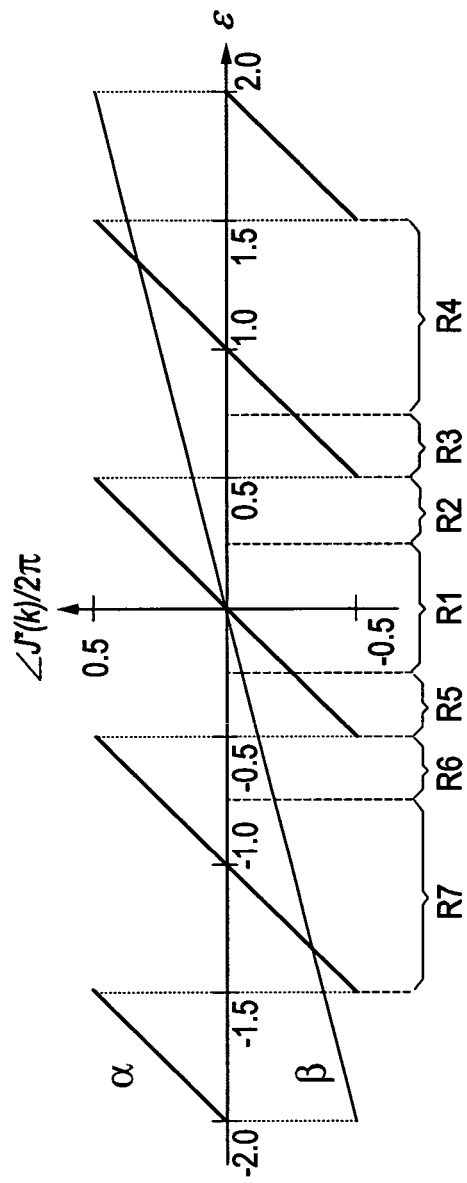

FIGS. 11a) and b) show the different decision regions for the combination of $\alpha$ and $\beta$ in the frequency offset estimation and correction. In this expression, certain regions R1 to R7 have been defined for different values of $\alpha$ and $\beta$, which are also indicated in FIGS. 11a) and b). The estimation $\epsilon$ of the frequency offset will be assigned in combination block 88 depending on these particular regions.

In the following paragraphs, an example of a method and device for symbol timing estimation will be described.

Unlike to what was done during carrier frequency offset estimation, where the periodicity of the short preamble symbols was the main feature used for the estimation, the symbol timing estimation will be obtained by exploiting the direct knowledge of the long preamble symbols 12 and 14. After the frame is detected, the synchronizer knows approximately which samples of the preamble have entered the delay line of the autocorrelator 20, but this knowledge is not enough for further processing and has to be refined.

Figure 17:
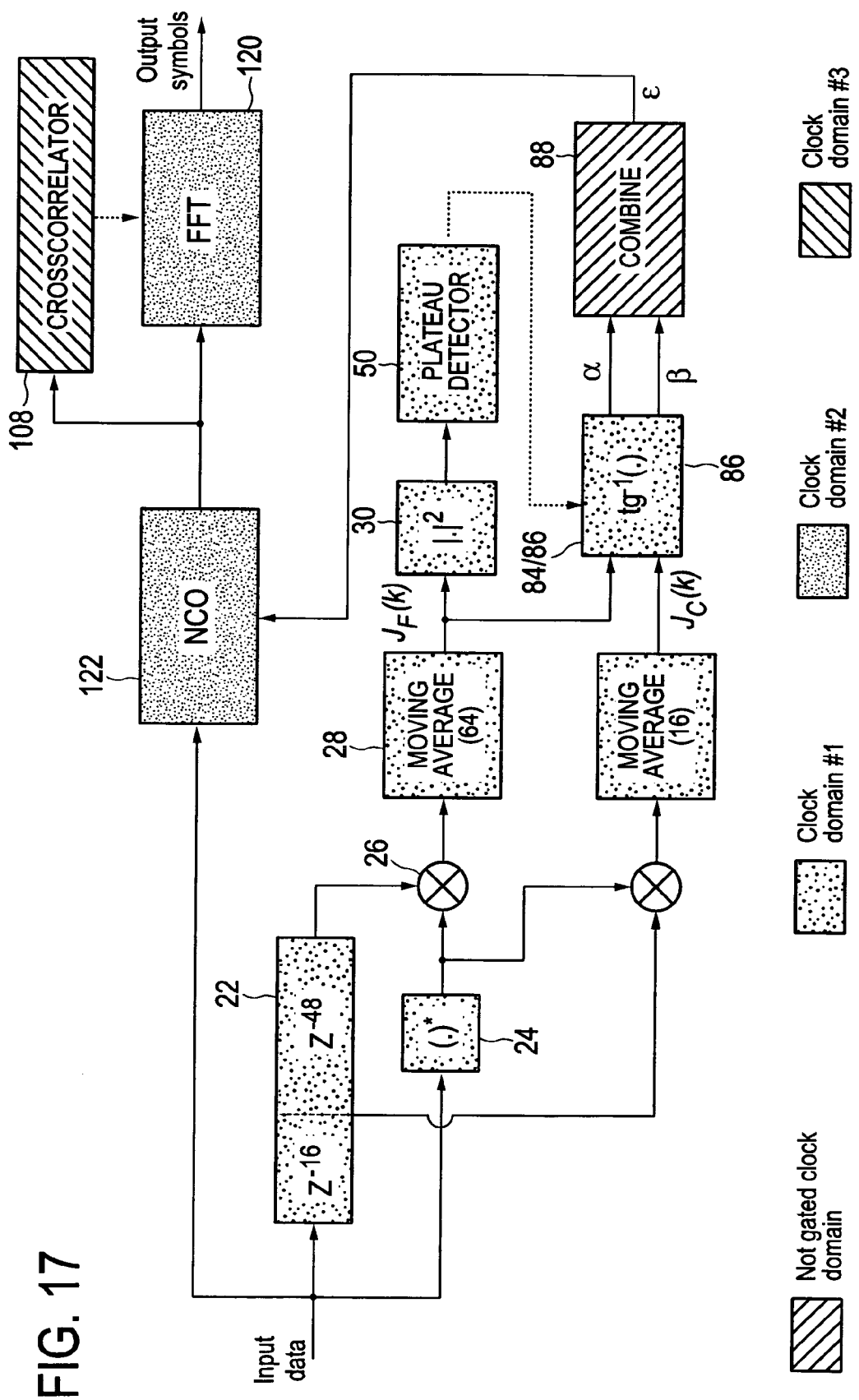
FIG. 17 shows a general synchronizer scheme with different clock domains. Each clock domain is activated when it has to carry out some kind of operation. If not, it is disabled in order to reduce the power consumption of the whole synchronizer.

The main block of the symbol timing estimator is a crosscorrelator, cf. FIG. 17. Its main purpose is to compare the input frame with a reference signal, which is directly obtained from the long preamble symbol. The crosscorrelation can only be applied once the samples of the input frame have been corrected for the frequency offset by the NCO.

Figure 12:
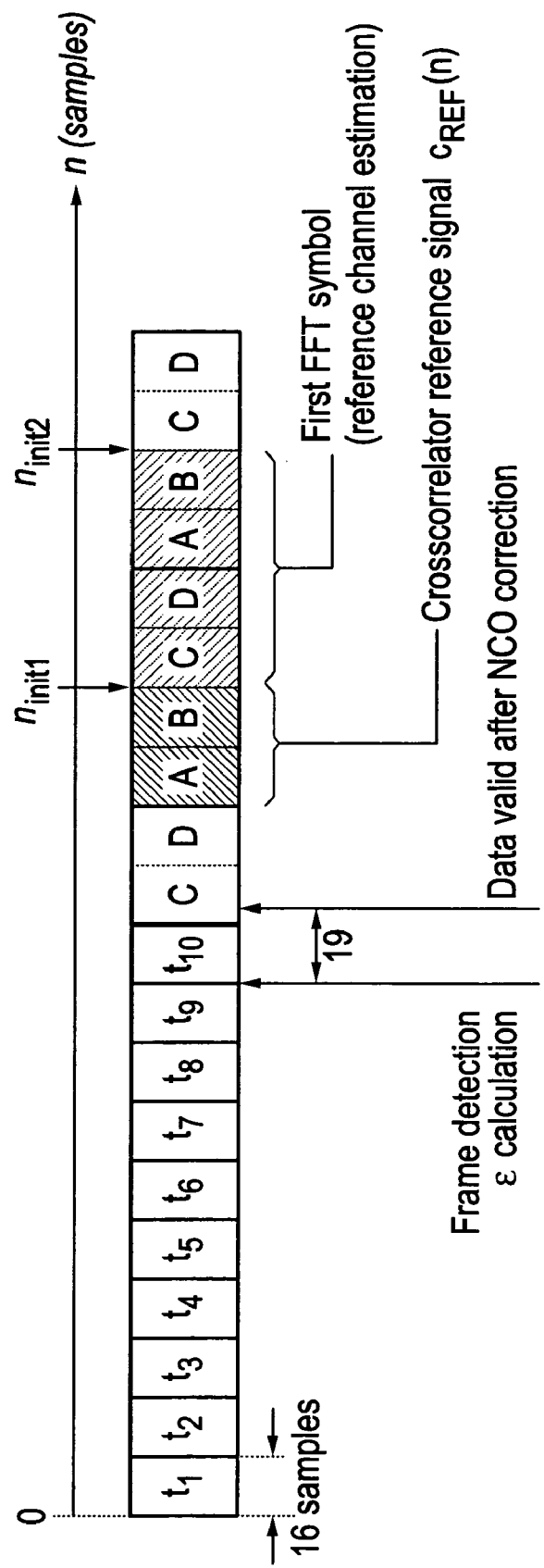
FIG. 12 shows a timing diagram of the whole synchronization procedure.

FIG. 12 shows a timing diagram of the whole synchronization procedure. This is important to show at which point the input frame has been already corrected for the frequency offset. Only when this correction is done to the input frame, the crosscorrelator can be used for the timing estimation. The figure shows also the portion of the long preamble symbols used as reference signal in the crosscorrelator. The "piece" of the long preamble symbols selected as the crosscorrelator reference $C_{REF}(n)$ is shown in FIG. 12. The reference has a length of 32 complex samples, which is the shortest possible length for this reference in order to obtain appropriate results after crosscorrelation.

Considering the standard IEEE 802.11a, the reference is as follows: $C_{REF}(0 \ldots 31)=\{0.1563, -0.0051-j0.1203, 0.0397-j0.1112, 0.0968+j0.0828, 0.0211+j0.0279, 0.0598-j0.0877, -0.1151-j0.0552, -0.0383-j0.1062, 0.0975-j0.0259, 0.0533+j0.0041, 0.0010-j0.1150, -0.1368-j0.0474, 0.0245-j0.0585, 0.0587-j0.0149, -0.0225+j0.1607, 0.1192-j0.0041, 0.0625-j0.0625, 0.0369+j0.0983, -0.0572+j0.0393, -0.1313+j0.0652, 0.0822+j0.0924, 0.0696+j0.0141, -0.0603+j0.0813, -0.0565-j0.0218, -0.0350-j0.1509, -0.1219-j0.0166, -0.1273-j0.0205, 0.0751-j0.0740, -0.0028+j0.0538, -0.0919+j0.1151, 0.0917+j0.1059, 0.0123+j0.0976\}$, where $j=\sqrt{-1}$.

From the implementation point of view, the complex crosscorrelator is usually a "weak" point in modem communication circuit designs because of its computation complexity (they require a large number of complex multipliers) and subsequent need for large silicon area. Having this in mind, in this implementation we used a simplified scheme for the crosscorrelator, based on simple XNOR 1-bit multipliers (FIG. 13), that substitute the commonly used complex multipliers.

Figure 13:
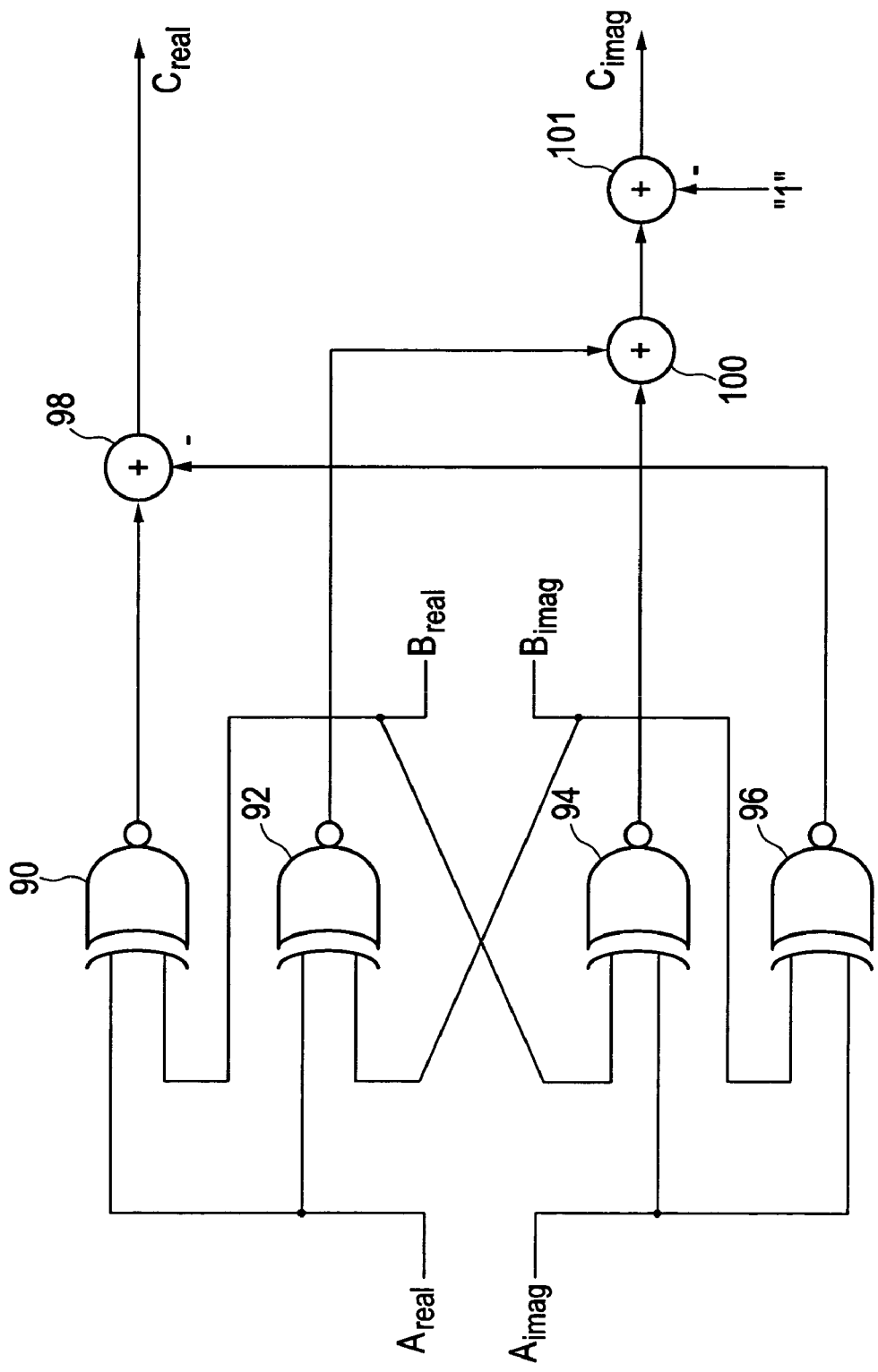
FIG. 13 shows a scheme of an XNOR-based complex multiplier.

FIG. 13 shows a scheme of an XNOR-based complex multiplier. The multiplier comprises four XNOR-gates 90 to 96 The two signals to be multiplied are $A=A_{real}+jA_{imag}$ and $B=B_{real}+jB_{imag}$, with $j=\sqrt{-1}$. Both real and imaginary parts are only one bit long, i.e. '1' if the signal is positive and '0' if it is negative. Thus, instead of multiplying N-bit complex numbers, the XNOR multiplier of FIG. 13 performs only the multiplication of the sign bits of the complex input values.

In the following, the use of XNOR multipliers for complex multiplication is explained in more detail:

The multiplication of two complex numbers $A=A_{real+jAimag}$, and $B=B_{real}+j B_{imag}$, where $j=sqrt(-1)$, results in $C=A \times B$, which is also complex with $C_{real}=(A_{real} \times B_{real})-(A_{imag} \times B_{imag})$ and $C_{imag}=(A_{imag} \times B_{real})+(A_{real} \times B_{imag})$ This means that in principle four multipliers 90 to 96 and two adders 98 and 100 are necessary.

In this case, the multiplication of $A_{real} \times B_{real}$ may comprise the following possible combinations:

| $A_{real}$ | $B_{real}$ | $A_{real} \times B_{real}$ |
|---|---|---|
| 0 | 0 | 1 |
| 0 | 1 | 0 |
| 1 | 0 | 0 |
| 1 | 1 | 1 |

This table is equivalent to a XNOR gate with inputs $A_{real}$ and $B_{real}$ i.e., this gate produces a '0' at the output when the number of '1' inputs is odd.

The previous operation has to be repeated 4 times in a complex multiplication. As mentioned before, in the present embodiment we represent $A_{real}$, $A_{imag}$, $B_{real}$ and $B_{imag}$ with a single bit, i.e., if they are positive we use a '1' whereas when negative we use a '0'. Let $dA_{real}$, $dA_{imag}$, $dB_{real}$, $dB_{imag}$, $dC_{real}$ and $dC_{imag}$ be the representation of $A_{real}$, $A_{imag}$, $B_{real}$, $B_{imag}$, $C_{real}$ and $C_{imag}$ by a single bit, respectively. Now the value of $dC_{real}$ and $dC_{imag}$ is:

$dC_{real}$=XNOR(dAreal, dBreal)−XNOR(dAimag, dBimag)

$dC_{imag}$=XNOR(dAimag, dBreal)+XNOR(dAreal, dBimag)

An important point to be noted is that the original signals $A_{real}$, $B_{real}$, $A_{imag}$ and $B_{imag}$ may take positive or negative values, but they have no DC level, i.e., on the average they are positive and negative the same amount of time. When converting them into '1' or '0' a DC level is introduced which is going to be 0.5. After the XNOR operation, the non-zero DC offset still will be present. Nevertheless this is not a problem when calculating $dC_{real}$ because the DC levels get compensated due to the subtraction operation. But for the case of $dC_{imag}$, both DC levels are accumulated. For this reason in FIG. 13 of the there is a DC level subtraction 101.

Figure 14:
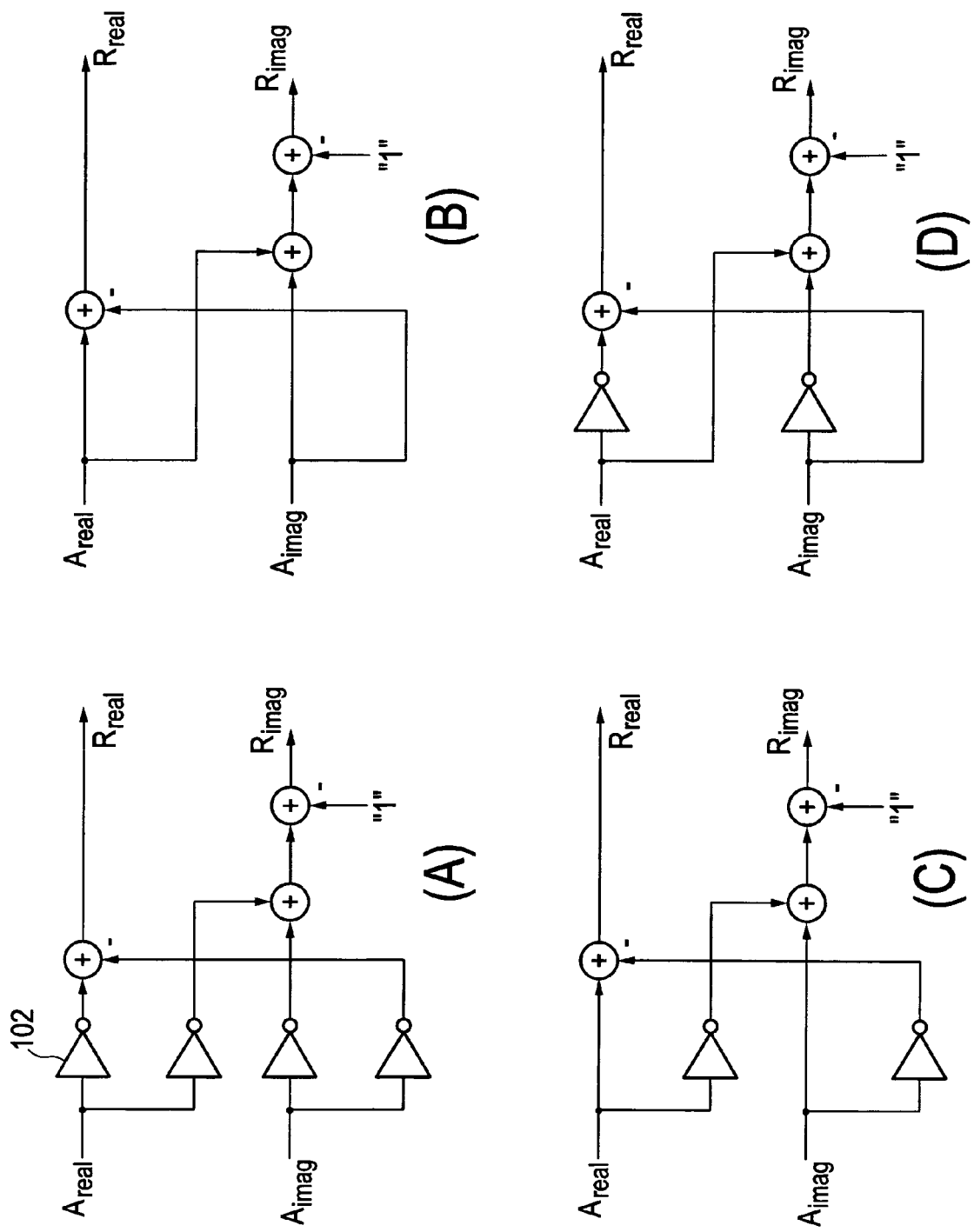
FIG. 14 shows possible simplifications of the XNOR-based complex multiplier if the input B is known a priori.

In addition, a further simplification in the structure of these multipliers is possible if one of the inputs is fixed and is known beforehand. The simplified structure of multipliers based on this knowledge is shown in FIG. 14 (A) to FIG. 14(D). FIG. 14 shows possible simplifications of the XNOR-based complex multiplier if the input B is known a priori. In this simplification, the XNOR gates may be replaced by NOT gates, which require a less number of transistors.

If the value of B is known beforehand, only two rows in the previous logic table are to be considered. There are four possible cases: $dB_{real}=0$, $dB_{imag}=0$; $dB_{real}=1$, $dB_{imag}=1$; $dB_{real}=1$, $dB_{imag}=0$; $dB_{real}=0$, $dB_{imag}=1$. In this case the XNOR gates are simplified to NOT gates, which require a smaller number of transistors.

Considering an example $dA_{real} \times dB_{real}$ knowing already that $dB_{real}=$'0', according to the previous table, the result of the multiplication is the inverse of the input. This means that no XNOR gate is needed but just a NOT gate, such as for example NOT gate 102 in FIG. 14 (A). On the other hand, if $dB_{real}$ is known to be '1', the previous table says that the result of the multiplication is directly the input value $dA_{real}$. Here, no gate is required at all, cf. for example FIG. 14 (B). The multipliers of FIGS. 14 (C) and (D) are built using similar considerations.

The final results $dC_{real}$ and $dC_{imag}$ are represented by 2 bits each. For comparison, if $A_{real}$, $B_{real}$, $A_{imag}$ and $B_{imag}$ were coded by for instance 16 bits, $C_{real}$ and $C_{imag}$ would comprise 32 bits if a full multiplication would have been used.

Figure 15:
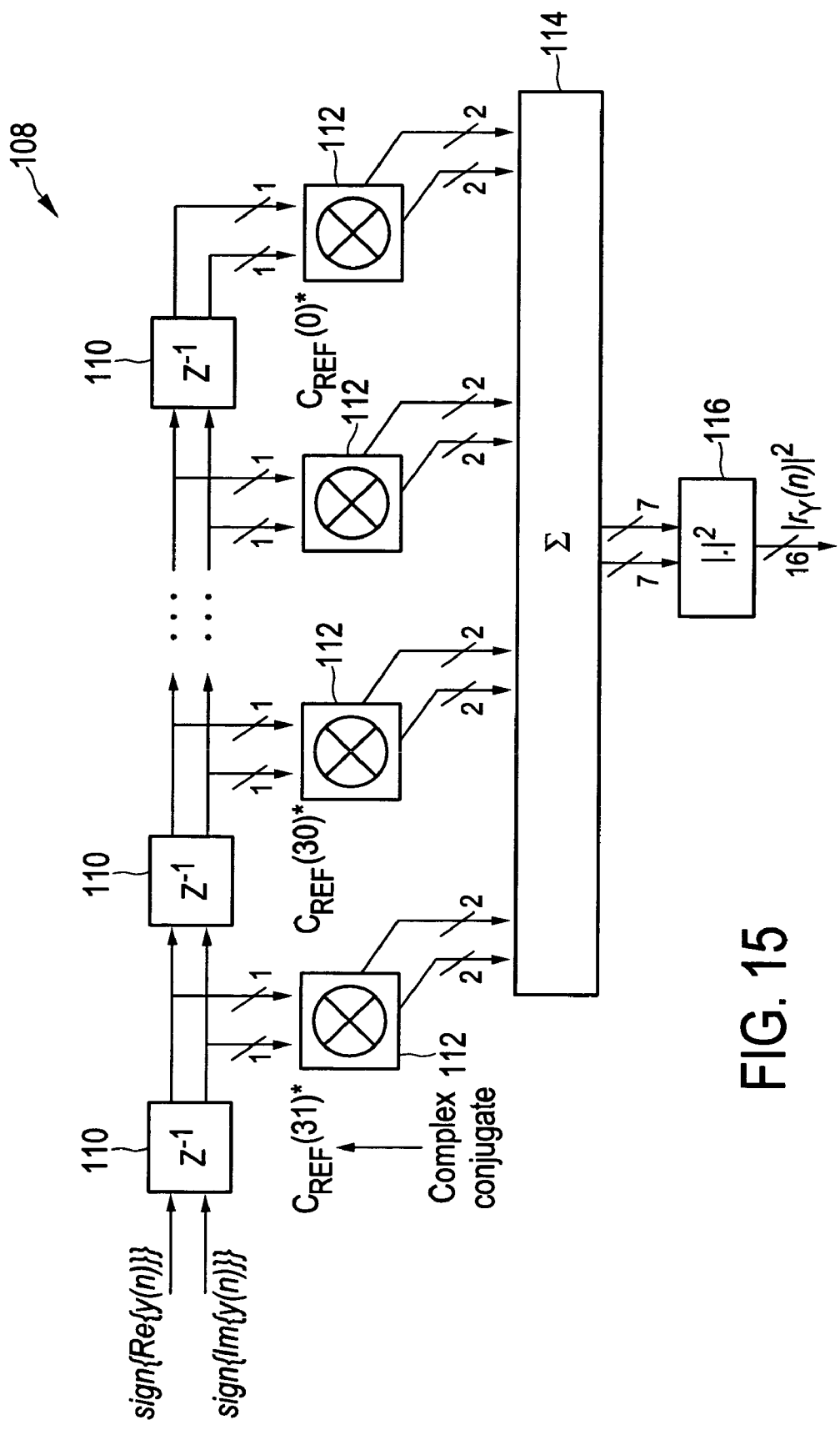
FIG. 15 shows a structure of the crosscorrelator used for timing estimation.

The final structure of a crosscorrelator 108 based on these principles is shown in FIG. 15. It is composed of 32 delay elements 110 and 32 multipliers 112. The structure of each multiplier 112 is chosen in dependence on the reference signal $C_{REF}(31, \ldots, 0)^*$, where we already considered the reference to be complex conjugated, hard-limited and order-reversed. The final reference looks as follows $C_{REF}(31, \ldots, 0)^* = \{1, 1, 0, 0, 1+j, j, j, j, j, 0, 1, 1, 0, 0, 1, 1+j, 1+j, 0, 1+j, 1+j, j, 1, 1+j, j, 1+j, 1, 1, 1+j, j, 1\}$, where $j=\sqrt{-1}$.

The multiplication signals are added in and adder 114. The square magnitude of the output of adder 114 is calculated in a block 116.

Figure 16:
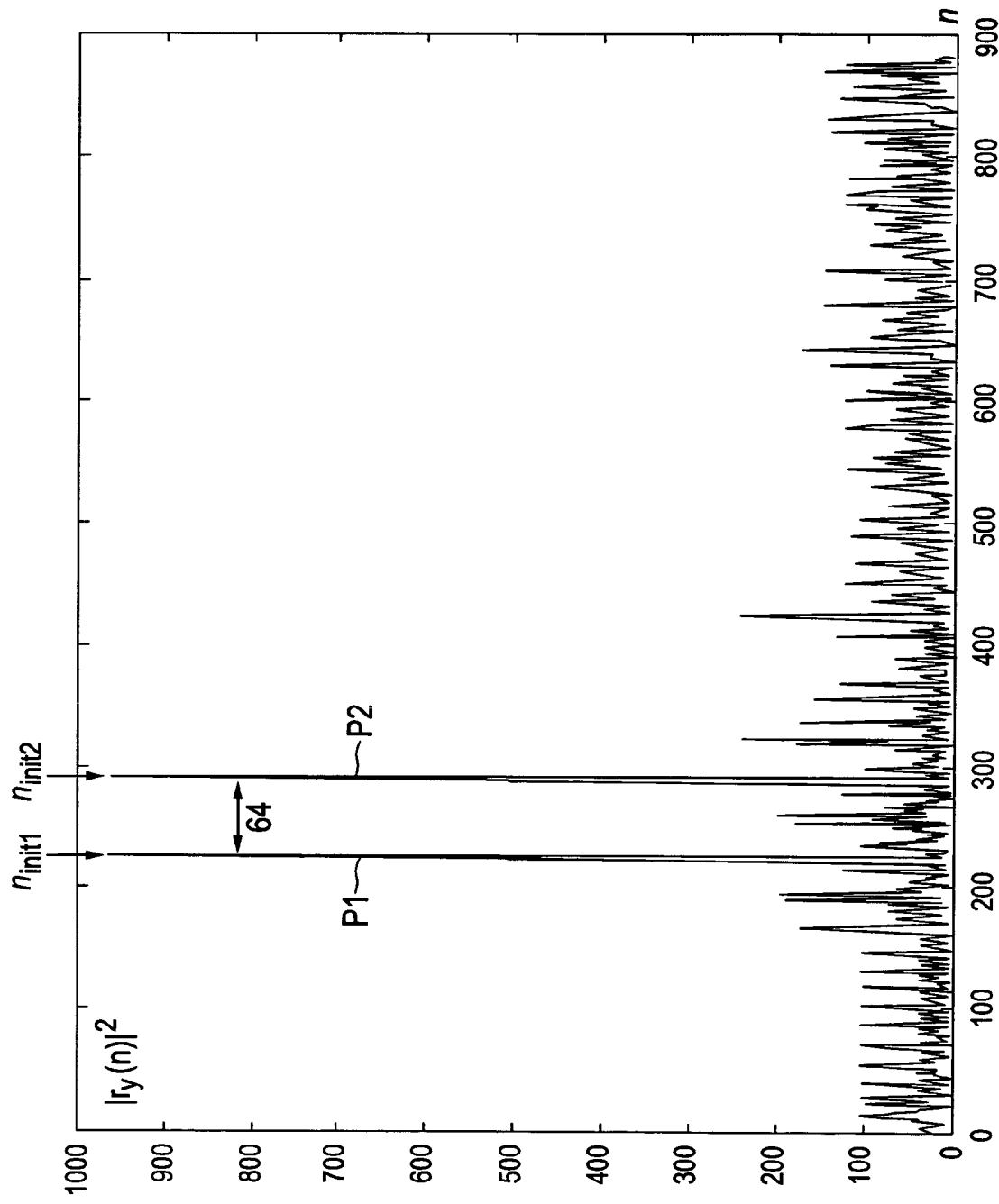
FIG. 16 shows the square magnitude of the output of the crosscorrelator when the reference signal is the portion of the long preamble symbols shown in FIG. 12.

The output of the crosscorrelator 108 is shown in FIG. 16 as a function of the numbers of clock cycles n, i.e., as a function of time. Two major peaks P1 and P2 become visible at instants $n_{init1}$ and $n_{init2}$. Both peaks P1 and P2 will occur when the portions AB in the long preamble symbols (see FIG. 12) are inside the crosscorrelator 108. For our purpose it is sufficient to detect the first peak P1 by setting a certain threshold at the output of the crosscorrelator 108. The 64 samples coming immediately after this first peak will be fed into an FFT block (CDAB fields marked with "First FFT symbol" in FIG. 12) in order to get the reference channel estimation.

The following description concerns the step of reference channel extraction. The reference channel estimation is used by the channel estimator in order to correct for the filtering due to the transmission channel. The reference channel will be obtained by calculating the FFT of the CDAB fields in FIG. 12. This operation is performed by an FFT block 120 (cf. FIG. 17) and may start immediately after the crosscorrelator 108 decides the initial timing $n_{init1}$. Nevertheless, the resulting FFT calculation has to be multiplied by the sequence $(-1)^m$, m being the frequency variable.

In the IEEE 802.11a standard, the actual long preamble symbols are defined as ABCD, i.e. a cyclic delay of 32 samples into a sequence of 64 samples is introduced. After performing the FFT, any time delay is seen as a linear phase, which in this specific case is reduced to the sequence $\exp\{-j2\pi(32/64)m\} = \exp\{-j\pi m\} = (-1)^m$. In order to compensate for this linear phase, the FFT output has to be multiplied exactly by this sequence.

The phase compensation mentioned above is only necessary when calculating the reference channel estimation. For the data symbols coming after the preamble no phase correction will be necessary.

FIG. 17 shows a general synchronizer scheme with different clock domains. Each clock domain is activated when it has to carry out some kind of operation. If not, it is disabled in order to reduce the power consumption of the whole synchronizer. The clock domains are indicated by different hatches in FIG. 17. A first clock domain comprises the autororrelators 20 and 82 (cf. also FIG. 10), peak detector 50, and the arctanblock 84/86. A second clock domain comprises NCO 122 and FFT block 120. A third clock domain includes crosscorrelator 108.

There are two further operations to be performed inside the FFT block 120 in FIG. 17. As the synchronizer already knows the timing of the input samples, it can detect the end of the preamble symbols and the beginning of the data symbols. The data symbols will go through a cyclic prefix extraction block (not shown) prior to the FFT calculation. The cyclic prefix extraction is mainly formed by a counter. For each data symbol, 80 samples are expected. The first 16 will be discarded and the last 64 will be fed into the FFT block 120. The cyclic prefix is inserted in the OFDM symbols in order to prevent the Inter-Symbol-Interference (ISI) caused by the channel filtering.

The last operation included inside the FFT block 120 is the channel reordering. Immediately after the FFT calculation, the output samples are delivered in the serial form according to the natural order. For further processing, this order has to be changed. Specifically, the data after FFT is given in the following order: $D_0, D_1, D_2, \ldots, D_{31}, D_{-32}, D_{-31}, D_{-30}, \ldots, D_{-1}$, where the subindex indicates the corresponding sub-channel. But the samples $D_0, D_{27}, D_{28}, D_{29}, D_{30}, D_{31}, D_{-32}, D_{-31}, D_{-30}, D_{-29}, D_{-28}$ and $D_{-27}$ (11 samples in total) carry no information and are directly discarded. The remaining 52 samples $\{D_k / k \in [1,26] \cup [-26,-1]\}$ are provided at the output of the FFT block 120 in the following order: $D_{-21}, D_{-7}, D_7, D_{21}, D_{-26}, D_{-25}, \ldots, D_{-22}, D_{-20}, D_{-19}, D_{-18}, \ldots, D_{-8}, D_{-6}, D_{-5}, \ldots, D_{-1}, D_1, \ldots, D_5, D_6, D_8, \ldots, D_{18}, D_{19}, D_{20}, D_{22}, \ldots, D_{25}, D_{26}$.

The actual implementation of the FFT processor 120 itself is not going to be explained in detail here. The main idea behind this implementation has been a mathematical manipulation of the definition of the FFT in order to convert the 64-point FFT into a 2-dimensional 8×8-point FFT. For more details see the German Patent application DE 100 62 759.5.

Figure 18:
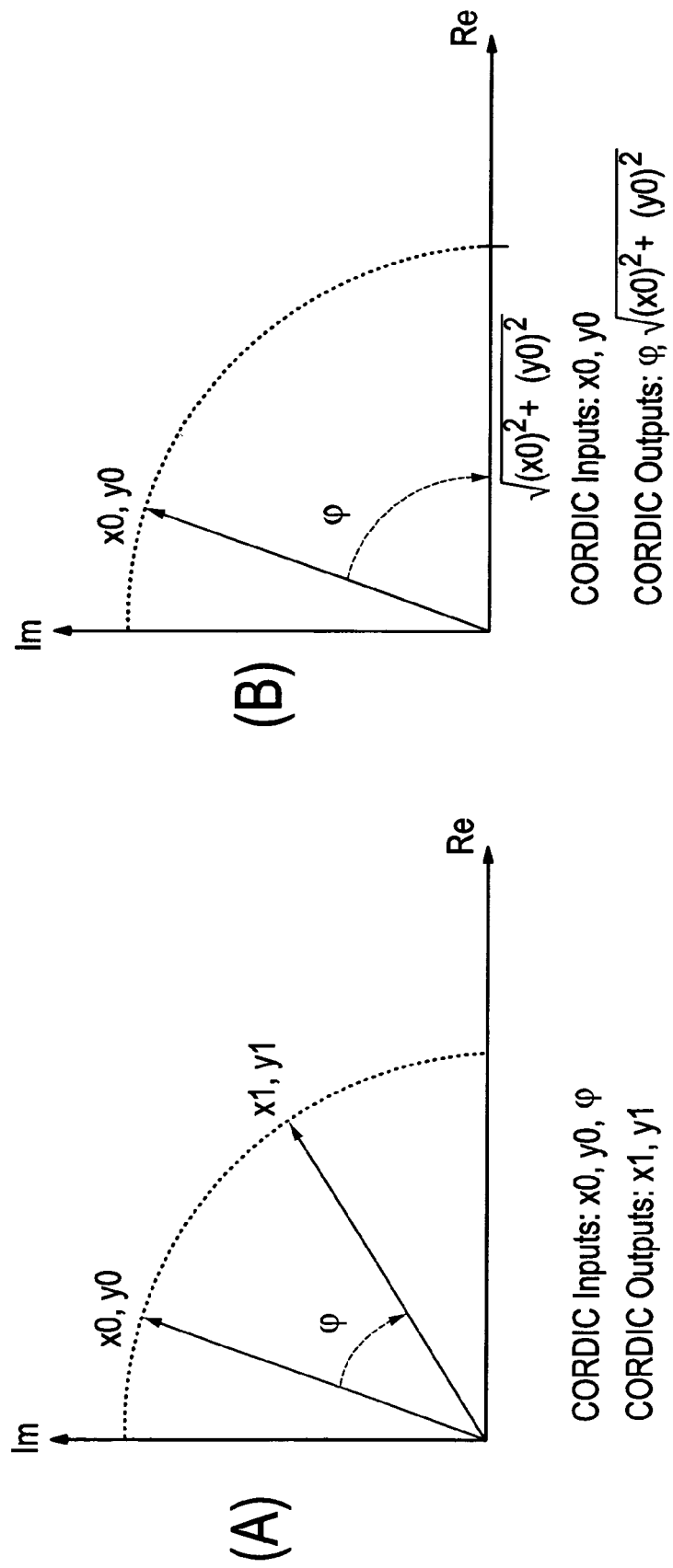
FIG. 18 shows a representation of the two operation modes of the circular CORDIC algorithm being used in the synchronizer.

FIG. 18 shows a representation of the two operation modes of the circular CORDIC algorithm being used in the synchronizer.

The CORDIC processor is a part of the synchronizer. The processor performs the circular CORDIC algorithm in both of its operation modes, viz. rotational and vectoring. While the rotation mode of operation of the CORDIC enables us to compute the multiplication of any quantity with a phasor $\exp\{j\phi\} = \cos(\phi) + j \sin(\phi)$, the vectoring mode can be used for computing the magnitude and the phase angle of a complex value. The operation principle of these two modes is shown in FIG. 18.

The rotational mode is useful to implement the NCO 122 whereas, the vectoring mode is useful for arctangent calculations in block 84,86. However, for the realization of the synchronizer, these two modes of operation of the CORDIC are independently utilized in two different phases. At first, the phases of $J_F(k)$ and $J_C(k)$ (see FIG. 10) are computed (vectoring mode of operation) to obtain α and β, respectively. After calculation of ε by combining α and β, this phase angle is used to obtain a phase correction for the incoming data symbols applying a numerically controlled oscillator (NCO) 122 in the rotation mode of operation. The phase angle evaluation takes place only once at the beginning of the frame (after frame detection) whereas, for the rest of the frame the NCO operation is carried out. Thus, in our consideration, it is more pragmatic to separate the two modes of CORDIC operation and realize them in the form of two separate modules. This separation of operations opens up the possibility for applying clock gating to save the power corresponding to the NCO 122 while the computation of the phase angle is carried on and vice versa. On the other hand, this separation results in a massive reduction of control hardware as no reuse of the component takes place that subsequently eliminates any feedback path. Another advantage of separating these two functionalities is that, in this case, it is possible to implement each of them in a much simplified and efficient manner.

When using the rotational CORDIC as an NCO, the input signal is multiplied by a phasor with the form $\exp\{j(2\pi/64)\cdot\epsilon\cdot n\}$, where $\epsilon$ is the estimated normalized carrier frequency offset (see FIG. 10) and n is the time variable. Thus, the variable $\phi$ in FIG. 18.a depends on n, and it is updated at each clock cycle. This is done by adding a phase accumulator to the input $\phi$ in the CORDIC processor.

We have to mention here that the value of $\epsilon$ must not be sign-reversed in order to apply a correct phase correction, because the result coming from the arctangent calculation already considers this sign. This can be easily seen in expression (4), where by definition, the phase contribution in J(k) already contains the –ve sign.

The actual implementation of the rotational and vectoring CORDIC processors is described in more detail in the German Patent 101 64 462.0.

In summary, the proposed synchronizer has the following advantages:

The proposed synchronizer has been designed as a power efficient system. This has been achieved in one side by optimizing each block independently and on the other side by dividing the whole synchronizer structure into different clock domains (see FIG. 17).

A clock domain separation helps to save power in the sense that only certain regions of the system are activated for operation, while others are not, by applying the clock gating. Thus, as shown in FIG. 17, three clock domains are used here. The blocks belonging to the clock domain #1 peer at the channel trying to detect an incoming frame through the peak detector algorithm. When this is true, the arctangent calculation is triggered, but it will operate only on two samples, thus obtaining two single values for $\alpha$ and $\beta$. Afterwards this clock domain is disabled. The combination of $\alpha$ and $\beta$ to finally obtain $\epsilon$ can be done using combinatorial logic, thus requiring no clock at all.

Disabling the clock domain #1, it is possible to save the power that otherwise would be consumed by the huge delay line at the input of the autocorrelator as well as the FIR structures of the moving average blocks.

Once the value for $\epsilon$ is available, the NCO 122 will start its operation until the end of the frame. The crosscorrelator 108 will be activated at the same time, but it will operate only until a peak is found at its output, being afterwards disabled. This is achieved by assigning a particular clock domain to the crosscorrelator 108 (clock domain #3).

The FFT block 120 is activated after a peak is detected at the output of the crosscorrelator and will operate like the NCO 122, until the end of the incoming frame, for that reason both the NCO 120 and the FFT blocks 120 belong to the same clock domain #2.

Apart from the power saving in the system level by applying clock gating, even more power saving is achieved by optimising each single block in the synchronizer as described above.

Thus, the frame detection algorithm is based on the knowledge of the ideal shape of the signal $|J_F(k)|^2$. A simple and robust peak detection algorithm is applied to this signal in order to detect an incoming frame. The arctangent calculation as well as the NCO 122 are based on the CORDIC algorithm. The CORDIC processors designed for these purposes have been optimised to reach the final angle in an adaptive way and thereby executing a minimum number of iteration steps. Furthermore, the crosscorrelator has been simplified to use XNOR-based complex multipliers instead of the normal complex multipliers and the reference signal therein has been shorten as much as possible in order to obtain valid results. Last but not least, the FFT processor 120 has been also optimised by using a new architecture, which requires no coefficient storing or complex multiplier.

The whole structure introduces a latency of 3.9 µs counted from the instant when the frame is detected. This value is less than one OFDM symbol period (4 µs), which means that no extra storage of the input samples has to be done inside the synchronizer.

In summary, there are the following inventions comprised in the above description:

The algorithm used for the frame detection, making use of a simplified differentiator to obtain an absolute maximum in the differentiated signal at that point where the first plateau in $J_F(k)$ starts (output of the autocorrelator with $N_d$=64);

The design of the peak detector to obtain the position of the absolute maximum in the differentiated signal, dividing the problem into relative peak detection and falling edge detection;

The way to combine the two frequency offsets $\alpha$ and $\beta$ to finally obtain $\epsilon$;

The use of a 32-sample long reference signal in the crosscorrelator for timing estimation;

The use of our simplified XNOR-based crosscorrelator, and the simplifications therein based on the knowledge of the reference;

The use of our particular solution for the CORDIC algorithm in the vectoring mode for arctangent calculation;

The use of our particular solution for the CORDIC algorithm as NCO for the frequency offset correction;

The hardware structuring of the whole synchronizer, allowing a very simple control mechanism and the separation of this structure into different clock domains, each one being activated only to perform its operation and deactivated afterwards.

The following is a table relating terms used in the present application to those used in European patent application 02 090 257.3, whose priority is claimed, with the same meaning.

| Priority application | This application |
| --- | --- |
| third signal | autocorrelation signal |
| fourth signal | second signal |
| fifth signal | differentiator signal |
| sixth signal | instantaneous peak detection signal |
| seventh signal | group peak detection signal |
| eighth signal | maximum detection signal |
| first predetermined number | third predetermined number |
| $N_d$ (claim 2) | $N_d$ |
| second predetermined number | fourth predetermined number |

-continued

| Priority application | This application |
|---|---|
| $N_{avg}$ (claim 3) | $N_{avg}$ |
| third predetermined number (claim 8) | first predetermined number |
| fourth predetermined number (claim 14) | predetermined accumulation number |
| predetermined range of sampling periods (claim 7) | second predetermined number of sampling periods |
| transforming step (claims 1 and 2) | step b), autocorrelation step (claim 1) |

The invention claimed is:

1. A method for detection of the reception of a data frame in an input signal ($Y_{OFF}(n)$), said data frame comprises periodically repeated symbols at the beginning, comprising the steps of a) sampling said input signal ($Y_{OFF}(n)$) with a predetermined sampling rate, b) generating a first signal ($|J(k)|^2$) that is dependent on an autocorrelation of said input signal with a delay copy of said input signal, c) detecting a plateau in said first signal ($|J(k)|^2$), and d) generating an output signal that is indicative of detecting said plateau, plateau, wherein said step of detecting a plateau comprises the steps of c1) generating a differentiator signal ($J_{DIFF}(k)$), which is dependent on rhea difference of a first sample of said first signal and a second sample of said first signal that was taken a first predetermined number of sampling periods earlier, and c2) detecting an absolute maximum of said differentiator signal ($J_{DIFF}(k)$) within a second predetermined number of sampling periods, further comprises a step of detecting a falling slope in said differentiator signal ($J_{DIFF}(k)$), wherein detecting a falling slope comprises the step of generating an accumulation signal that is dependent on the sum of said differentiator signal ($J_{DIFF}(k)$) over a fourth predetermined number of consecutive sampling periods, comparing said current accumulation signal with the last previous accumulation signal representing without overlap said fourth predetermined number of consecutive earlier sampling periods, and generating a group peak detection signal indicative of whether or not the value of said current accumulation signal is smaller than the value of said earlier accumulation signal.

2. The method according to claim 1, wherein said step c2) of detecting an absolute maximum comprises an instantaneous peak detection step and a step of detecting a falling slope in the differentiator signal ($J_{diff}(k)$).

3. The method according to claim 2, wherein the instantaneous peak detection step and the group peak detection step are performed in parallel.

4. The method of claim 2, wherein the instantaneous peak detection step comprises a step of comparing the differentiator signal ($J_{diff}(k)$) of a current sampling period with the differentiator signal ($J_{diff}(k)$) of a next previous sampling period, and a step of saving the differentiator signal ($J_{diff}(k)$) of the current sampling period to a register, given the condition that its value is larger than that of the differentiator signal ($J_{diff}(k)$) of the previous sampling period.

5. A method according to claim 4, comprising a step of incrementing a count index by one, given the condition that the value of said differentiator signal ($J_{diff}(k)$) of said current sampling period is equal or smaller than that of said differentiator signal ($J_{diff}(k)$) saved in said register.

6. A method according to claim 5, comprising a step of generating an instantaneous peak detection signal indicative of the condition whether or not the count index has reached a predetermined count value.

7. A method according to claim 1, wherein said output signal is indicative of the time of detecting said plateau.

8. A method according to claim 1, wherein said method is used for detecting a data frame containing OFDM symbols.

9. A method according to claim 1, wherein the input signal is amplified such that the power of the amplified input signal is in a predetermined power range.

10. A method according to claim 1, wherein the step of detecting a plateau in said first signal ($|J(k)|^2$) is performed only if the first signal exceeds a predetermined threshold value.

11. A synchronizing method comprising a step of detecting a frame in an input signal, wherein the frame detection step is performed with the method of claim 1.

12. A synchronizing method according to claim 11, further comprising a step of estimating a relative frequency offset ($f_\epsilon$) in an input signal ($y_{OFF}(n)$) after said step of detecting a frame, wherein the estimating step comprises the steps of
    a) estimating a coarse frequency offset ($\beta$), and
    b) estimating a fine frequency offset ($\alpha$) in dependence of said estimated coarse frequency offset ($\beta$).

13. The synchronizing method of claim 12, wherein the steps of estimating a coarse frequency offset ($\beta$) or of estimating a fine frequency offset, or both steps, comprise a step of calculating a phase value of said first signal ($|J(k)|^2$).

14. The synchronizing method of claim 11, further comprising a step of correcting the input signal by the estimated value.

15. The synchronizing method of claim 14, further comprising after said step of frequency offset correction a step of estimating the time of reception of at least one symbol contained in a received data frame (hereinafter symbol timing step).

16. The synchronizing method of claim 15, wherein the symbol timing step comprises a step of generating a crosscorrelation signal, which is dependent on the value of the crosscorrelation of the corrected input signal with a known reference signal, wherein the reference signal is a first section of long preamble symbols included in the data frame.

17. The synchronizing method of claim 16, wherein the reference signal is 32 samples long.

18. The synchronizing method of claim 15, further comprising a step of estimating a reference channel.

19. The synchronizing method of claim 18, wherein estimating the reference channel comprises a step of performing a Fast Fourier Transform of a second section of the long preamble symbols included in the data frame.

20. A method for the detection of the reception of a data frame in an input signal ($Y_{OFF}(n)$), said data frame comprising periodically repeated symbols at the beginning, comprising the steps of a) sampling said input signal ($Y_{OFF}(n)$) with a predetermined sampling rate, b) generating a first signal ($|J(k)|^2$) that is dependent on an autocorrelation of said input signal with a delayed copy of said input signal, c) detecting a plateau in said first signal ($|J(k)|^2$), and d) generating an output signal that is indicative of detecting said ptateal~, plateau, wherein said step of detecting a plateau comprises the steps of c1) generating a differentiator signal ($J_{DIFF}(k)$), which is dependent on rhea difference of a first sample of said first signal and a second sample of said first signal that was taken a first predetermined number of sampling periods earlier, and c2) detecting an absolute maximum of said differentiator signal ($J_{DIFF}(k)$) within a second predetermined number of sampling periods, wherein said step c2) of detecting an absolute maximum comprises an instantaneous peak detection step and a step of detecting a falling slope in the differentiator signal ($J_{DIFF}(k)$), wherein the instantaneous peak detection step comprises a step of comparing the differentiator signal ($J_{DIFF}(k)$) of a current sampling period with the differentiator signal ($J_{DIFF}(k)$) of a next previous sampling period, and a step of saving the differentiator signal ($J_{DIFF}(k)$) of the current sampling period to a register, given the condition that its value is larger than that of the differentiator signal ($J_{DIFF}(k)$) of the previous sampling period, further comprising a step of incrementing a count index by one, given the condition that the value of said differentiator signal ($J_{DIFF}(k)$) of said current sampling period is equal or smaller than that of said differentiator signal ($J_{DIFF}(k)$) saved in said register, further comprising a step of generating an instantaneous peak detection signal indicative of the condition whether or not the count index has reached a predetermined count value; and further comprising a step of generating a maximum detection signal indicative of the condition that said instantaneous peak detection signal indicates that the count index has reached the predetermined count value, and that said group peak detection signal indicates that the value of said current accumulation signal is smaller than said value of said earlier accumulation signal.

21. A frame detector for detecting the reception of a data frame in an input signal ($Y_{OFF}(n)$), said data frame comprising periodically repeated symbols at the beginning, comprising a) a sampling unit adapted to sample said input signal ($Y_{OFF}(n)$) with a predetermined sampling rate, b) an autocorrelation unit adapted to transform said input signal ($Y_{OFF}(n)$) into a first signal ($|J(k)|^2$) that is dependent on an autocorrelation of said input signal with a delayed copy of said input signal, c) a plateau detector, adapted to detect a plateau in said first signal ($|J(k)|^2$) and d) an output unit adapted to generate an output signal that is indicative of detecting said plateau, wherein said plateau detector is adapted to generate a differentiator signal ($J_{DIFF}(k)$), which is dependent on the difference of a first sample of said first signal and a second sample of said first signal a predetermined number of sampling periods earlier, to detect an absolute maximum of said differentiator signal ($J_{DIFF}(k)$) within a predetermined range of sampling periods, and to provide a signal indicative of detecting said absolute maximum to said output unit, wherein said plateau detector comprises a peak detection unit with a) a first detection unit connected to said input port and comprising a first memory unit, said first detection unit being adapted to comparing said input signal ($J_{DIFF}(k)$) received through said input port with a first entry contained in said first memory unit, and replacing said first entry by said input signal given the condition that the value of said input signal ($J_{DIFF}(k)$) is larger than the value of said first entry; and b) a second detection unit connected to said input port and comprising a second memory unit, said second detection unit being adapted to—generating an accumulation signal, that is dependent on the sum of a current input signal ($J_{DIFF}(k)$) and of said fourth predetermined number of previous input signals ($J_{DIFF}(k)$), —comparing said accumulation signal with a second entry contained in said second memory for at least, and— replacing said second entry by said accumulation signal given the condition that the value of said accumulation signal ($J_{DIFF}(k)$) is larger than the value of said second entry, said peak detection unit being adapted to providing a peak detector output signal at its output port indicative of whether or not said first entry has been unchanged for a predetermined number of sample periods and said second entry has been changed in said current sampling period.

22. A synchronizer device comprising a frame detector according to claim 21.

23. The synchronizer device of claim 22, further comprising a symbol timing unit adapted to generate a crosscorrelation signal, which is dependent on the value of the crosscorrelation of the corrected input signal with a known reference signal, wherein the reference signal is a first section of long preamble symbols included in the data frame.

24. The synchronizer device of claim 23, wherein the symbol timing unit comprises a crosscorrelation unit with a number of multipliers for complex numbers, and wherein at least one multiplier is made of a combination of XNOR-gates, inverter gates and adders.

25. The synchronizer device of claim 22, wherein the frame detection unit and the symbol timing unit can be enabled or disabled individually.

26. A method for the detection of the reception of a data frame in an input signal ($Y_{OFF}(n)$), said data frame comprising periodically repeated symbols at the beginning, comprising the steps of a) sampling said input signal ($Y_{OFF}(n)$) with a predetermined sampling rate, b) generating a first signal ($|J(k)|^2$) that is dependent on an autocorrelation of said input signal with a delayed copy of said input signal, c) detecting a plateau in said first signal ($|J(k)|^2$), and d) generating an output signal that is indicative of detecting said plateau, plateau, wherein said step of detecting a plateau comprises the steps of c1) generating a differentiator signal ($J_{DIFF}(k)$), which is dependent on rhea difference of a first sample of said first signal and a second sample of said first signal that was taken a first predetermined number of sampling periods earlier, and c2) detecting an absolute maximum of said differentiator signal ($J_{DIFF}(k)$) within a second predetermined number of sampling periods, further comprising a step of estimating a relative frequency offset ($f_F$) in an input signal ($Y_{OFF}(n)$) after said step of detecting a frame, wherein the estimating step comprises the steps of a) estimating a coarse frequency offset (13), and b) estimating a fine frequency offset ($\alpha$) in dependence of said estimated coarse frequency offset ($\beta$), and wherein the step of estimating the frequency offset comprises a step of assigning a fine frequency offset value dependent on the value of the coarse frequency offset according to the following function:

$$\epsilon=\alpha; \text{ if } (-0.25)/4 \leq \beta \leq (0.25)/4 \tag{R1}$$

$$\epsilon=\alpha; \text{ if } \alpha \geq 0 \text{ and } (0.25)/4 < \beta < (0.75)/4 \tag{R2}$$

$$\epsilon=1+\alpha; \text{ if } \alpha<0 \text{ and } (0.25)/4 < \beta < (0.75)/4 \tag{R3}$$

$$\epsilon=1+\alpha; \text{ if } \beta \geq (0.75)/4 \tag{R4}$$

$$\epsilon=-1+\alpha; \text{ if } \alpha \geq 0 \text{ and } (-0.75)/4 < \beta < (-0.25)/4 \tag{R5}$$

$$\epsilon=\alpha; \text{ if } \alpha<0 \text{ and } (-0.75)/4 < \beta < (-0.25)/4 \tag{R6}$$

$$\epsilon=-1+\alpha; \text{ if } \beta \leq (-0.75)/4 \tag{R7}$$

27. A method for the detection of the reception of a data frame in an input signal ($Y_{OFF}(n)$), said data frame comprising periodically repeated symbols at the beginning, comprising the steps of a) sampling said input signal ($Y_{OFF}(n)$) with a predetermined sampling rate, b) generating a first signal ($|J(k)|^2$) that is dependent on an autocorrelation of said input signal with a delayed copy of said input signal, c) detecting a plateau in said first signal ($|J(k)|^2$), and d) generating an output signal that is indicative of detecting said plateau, plateau, wherein said step of detecting a plateau comprises the steps of c1) generating a differentiator signal ($J_{DIFF}(k)$), which is dependent on rhea difference of a first sample of said first signal and a second sample of said first signal that was taken a first predetermined number of sampling periods earlier, and c2) detecting an absolute maximum of said differentiator signal ($J_{DIFF}(k)$) within a second predetermined number of sampling periods, further comprising a step of estimating a relative frequency offset ($f_F$) in an input signal ($Y_{OFF}(n)$) after said step of detecting a frame, wherein the estimating step comprises the steps of a) estimating a coarse frequency offset (13), and b) estimating a fine frequency offset ($\alpha$) in dependence of said estimated coarse frequency offset ($\beta$). and wherein the step of estimating the frequency offset comprises a step of assigning a fine frequency offset value dependent on the value of the coarse frequency offset according to the following function:

$\epsilon = \alpha$; if $(-0.1)/4 \leq \beta \leq (0.1)/4$ (R1)

$\epsilon = \alpha$; if $\alpha \geq 0$ and $(0.1)/4 < \beta < (0.9)/4$ (R2)

$\epsilon = 1+\alpha$; if $\alpha < 0$ and $(0.1)/4 < \beta < (0.9)/4$ (R3)

$\epsilon = 1+\alpha$; if $\beta \geq (0.9)/4$ (R4)

$\epsilon = $; if $\alpha < 0$ and $(-0.9)/4 < \beta < (-0.1)/4$ (R5)

$\epsilon = -1+\alpha$; if $\alpha \geq 0$ and $(-0.9)/4 < \beta < (-0.1)/4$ (R6)

$\epsilon = -1+\alpha$; if $\beta \leq (-0.9)/4$ (R7).

\* \* \* \* \*

UNITED STATES PATENT AND TRADEMARK OFFICE
CERTIFICATE OF CORRECTION

| | |
|---|---|
| PATENT NO. | : 7,606,333 B2 |
| APPLICATION NO. | : 10/521396 |
| DATED | : October 20, 2009 |
| INVENTOR(S) | : Troya et al. |

It is certified that error appears in the above-identified patent and that said Letters Patent is hereby corrected as shown below:

Column 1, line 48, please insert --.-- after the word "part".

Column 2, line 64, please insert --d)-- before the word "generating".

Column 10, line 11, please insert --.-- after the word "reset".

Column 10, line 61, please insert --.-- after the word "offset".

Column 12, line 17, please insert --.-- after the word "amount".

Column 12, line 49, please remove "a" and insert --α-- therefor.

Column 13, line 19, please remove "αand" and insert --α and-- therefor.

Column 13, line 65, please remove the word "modem" and replace it with --modern--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,606,333 B2 | Page 1 of 1 |
| APPLICATION NO. | : 10/521396 | |
| DATED | : October 20, 2009 | |
| INVENTOR(S) | : Troya et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 939 days.

Signed and Sealed this

Twelfth Day of October, 2010

David J. Kappos
*Director of the United States Patent and Trademark Office*